(12) United States Patent
Malinoski et al.

(10) Patent No.: US 8,084,134 B2
(45) Date of Patent: Dec. 27, 2011

(54) TRANSPARENT THERMOPLASTIC COMPOSITIONS HAVING HIGH FLOW AND DUCTILIY, AND ARTICLES PREPARED THEREFROM

(75) Inventors: Jon M. Malinoski, Evansville, IN (US); Sriramakrishna Maruvuda, Evansville, IN (US); Anirudha Singh, Evansville, IN (US)

(73) Assignee: Sabic Innovative Plastics IP B.V. (NL)

( * ) Notice: Subject to any disclaimer, the term of this patent is extended or adjusted under 35 U.S.C. 154(b) by 565 days.

(21) Appl. No.: 12/324,060

(22) Filed: Nov. 26, 2008

(65) Prior Publication Data

US 2010/0129649 A1    May 27, 2010

(51) Int. Cl.
*B32B 9/04* (2006.01)
*C08G 77/04* (2006.01)

(52) U.S. Cl. ........ 428/447; 359/642; 359/712; 525/446; 525/464; 528/26; 528/305

(58) Field of Classification Search .................. 359/642, 359/712; 428/447; 525/446, 464; 528/26, 528/305
See application file for complete search history.

(56) References Cited

U.S. PATENT DOCUMENTS

| | | | |
|---|---|---|---|
| 3,030,331 | A | 4/1962 | Goldberg |
| 3,169,121 | A | 2/1965 | Goldberg |
| 4,616,042 | A | 10/1986 | Avakian |
| 4,945,148 | A | 7/1990 | Rich et al. |
| 4,983,706 | A | 1/1991 | Fontana et al. |
| 5,015,720 | A | 5/1991 | Boden et al. |
| 5,025,081 | A | 6/1991 | Fontana et al. |
| 5,510,182 | A | 4/1996 | Fontana et al. |
| 5,608,026 | A | 3/1997 | Hoover et al. |
| 7,321,014 | B2 * | 1/2008 | Glasgow et al. ............. 525/464 |
| 2006/0142527 | A1 * | 6/2006 | Glasgow et al. ................ 528/26 |

FOREIGN PATENT DOCUMENTS

| | | |
|---|---|---|
| EP | 0522752 | 1/1993 |
| EP | 0524731 | 1/1993 |

OTHER PUBLICATIONS

International Search Report; International Application No. PCT/US2009/065503; International Filing Date: Nov. 23, 2009; Date of Mailing: Feb. 1, 2010; 6 Pages.
Written Opinion of the International Search Report; International Application No. PCT/US2009/065503; International Filing Date: Nov. 23, 2009; Date of Mailing: Feb. 1, 2010; 5 Pages.

* cited by examiner

*Primary Examiner* — Terressa Boykin
(74) *Attorney, Agent, or Firm* — Cantor Colburn LLP

(57) ABSTRACT

Disclosed herein is a thermoplastic composition comprising a combination of: a polysiloxane-polycarbonate copolymer and a poly(aliphatic ester)-polycarbonate copolymer comprising soft block ester units of the formula (8a):

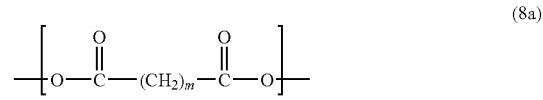

(8a)

wherein m is 4 to 18, wherein the thermoplastic composition has a melt volume rate of 14 cc/10 min to 22 cc/10 min at 300° C. and under a load of 1.2 Kg and a dwell time of 6 minutes, according to ASTM D1238-04, wherein an article molded from the thermoplastic composition and having a thickness of 3.2 mm has a percent transmittance of greater than 85% according to ASTM D1003-00, and wherein 100% of a set of five test articles each having a thickness of 3.2 mm and molded from the thermoplastic composition exhibit ductile fracture at −40° C. when measured for notched Izod Impact according to ASTM D256-04. An article comprising the thermoplastic composition is also disclosed.

26 Claims, 3 Drawing Sheets

TRANSPARENT THERMOPLASTIC COMPOSITIONS HAVING HIGH FLOW AND DUCTILIY, AND ARTICLES PREPARED THEREFROM

BACKGROUND OF THE INVENTION

This invention is directed to transparent thermoplastic compositions having high flow and ductility, and in particular to thermoplastic compositions comprising a polysiloxane-polycarbonate copolymer and a poly(aliphatic ester)-polycarbonate copolymer, and articles prepared therefrom.

Polycarbonates, relative to other thermoplastics, are noted for their exceptional optical properties, thermal resistance, and mechanical properties such as impact strength. High flow polycarbonates, typically those having low molecular weights and/or a higher degree of branching (obtained by inclusion of trifunctional or higher monomers as branching points within the polycarbonate chain, are available where thorough mold-filling capabilities are required as for injection molding of parts with very thin dimensions and long flow lengths, where a lower flow material would not fill the mold completely before hardening, or would require excessively high mold temperatures that can result in thermal degradation and loss of desirable optical properties. In order to obtain such desirable flow properties however, the impact strength of the polycarbonate, and other mechanical properties (elongation at break, fatigue stress, and the like), may be compromised. Thin-wall and complex injection molded parts with minimal residual stress and low temperature ductility are therefore not readily prepared from existing polycarbonate materials.

BRIEF SUMMARY OF THE INVENTION

The above-described and other drawbacks are alleviated by, in an embodiment, a thermoplastic composition comprising a combination of: a polysiloxane-polycarbonate copolymer and a poly(aliphatic ester)-polycarbonate copolymer comprising soft block ester units of the formula (8a):

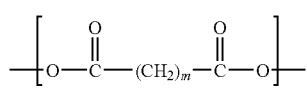
(8a)

wherein m is 4 to 18, wherein the thermoplastic composition has a melt volume rate of 14 cc/10 min to 22 cc/10 min at 300° C. and under a load of 1.2 Kg and a dwell time of 6 minutes, according to ASTM D1238-04, wherein an article molded from the thermoplastic composition and having a thickness of 3.2 mm has a percent transmittance of greater than 85% according to ASTM D1003-00, and wherein 100% of a set of five test articles each having a thickness of 3.2 mm and molded from the thermoplastic composition exhibit ductile fracture at −40° C. when measured for notched Izod Impact according to ASTM D256-04.

In another embodiment, a thermoplastic composition comprises a combination of: a polysiloxane-polycarbonate copolymer, and a poly(aliphatic ester)-polycarbonate copolymer comprising soft block ester units of the formula (8a)

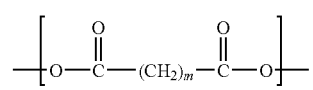
(8a)

wherein m is 4 to 18, wherein the thermoplastic composition has a melt volume rate of 14 to 26 cc/10 min at 300° C. and under a load of 1.2 Kg and a dwell time of 6 minutes, according to ASTM D1238-04, wherein an article molded from the thermoplastic composition and having a thickness of 3.2 mm has a percent transmittance of greater than 85% according to ASTM D1003-00, and wherein 100% of a set of five test articles each having a thickness of 3.2 mm and molded from the thermoplastic composition exhibit ductile fracture at −30° C. when measured for notched Izod Impact according to ASTM D256-04.

In another embodiment, an article comprises a thermoplastic composition comprising: a polysiloxane-polycarbonate, and a poly(aliphatic ester)-polycarbonate comprising soft block ester units of the formula (8a):

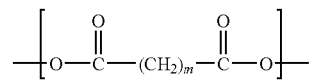
(8a)

wherein m is 8 to 10, wherein the thermoplastic composition comprises 1 to 6 wt % siloxane units, based on the total weight of the polysiloxane-polycarbonate and poly(aliphatic ester)-polycarbonate and has a glass transition temperature of 143 to 147° C., wherein the thermoplastic composition has a melt volume rate of 14 cc/10 min to 22 cc/10 min at 300° C. and under a load of 1.2 Kg and a dwell time of 6 minutes, according to ASTM D1238-04, wherein an article molded from the thermoplastic composition and having a thickness of 3.2 mm has a percent transmittance of greater than 85% according to ASTM D1003-00, and wherein 100% of a set of five test articles each having a thickness of 3.2 mm and molded from the thermoplastic composition exhibit ductile fracture at −40° C. when measured for notched Izod Impact according to ASTM D256-04.

In another embodiment, an article comprises a thermoplastic composition comprising: 55 to 90 wt % of a polysiloxane-polycarbonate, and 10 to 45 wt % of a poly(aliphatic ester)-polycarbonate comprising soft block ester units of the formula (8a)

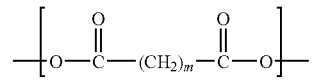
(8a)

wherein m is 8 to 10, wherein the percentages of polysiloxane-polycarbonate and poly(aliphatic ester)-polycarbonate are each based on the total weight of polysiloxane-polycarbonate and poly(aliphatic ester)-polycarbonate, wherein the thermoplastic composition comprises 1 to 6 wt % siloxane units, based on the total weight of the polysiloxane-polycarbonate and poly(aliphatic ester)-polycarbonate and has a glass transition temperature of 143 to 147° C., wherein the thermoplastic composition has a melt volume rate of 14 cc/10 min to 22 cc/10 min at 300° C. and under a load of 1.2 Kg and a dwell time of 6 minutes, according to ASTM D1238-04, wherein an article molded from the thermoplastic composition and having a thickness of 3.2 mm has a percent transmittance of greater than 85% according to ASTM D1003-00, and wherein 100% of a set of five test articles each having a thickness of 3.2 mm and molded from the thermoplastic composition exhibit ductile fracture at −40° C. when measured for notched Izod Impact according to ASTM D256-04.

A description of the figures, which are meant to be exemplary and not limiting, is provided below.

Figure 1:
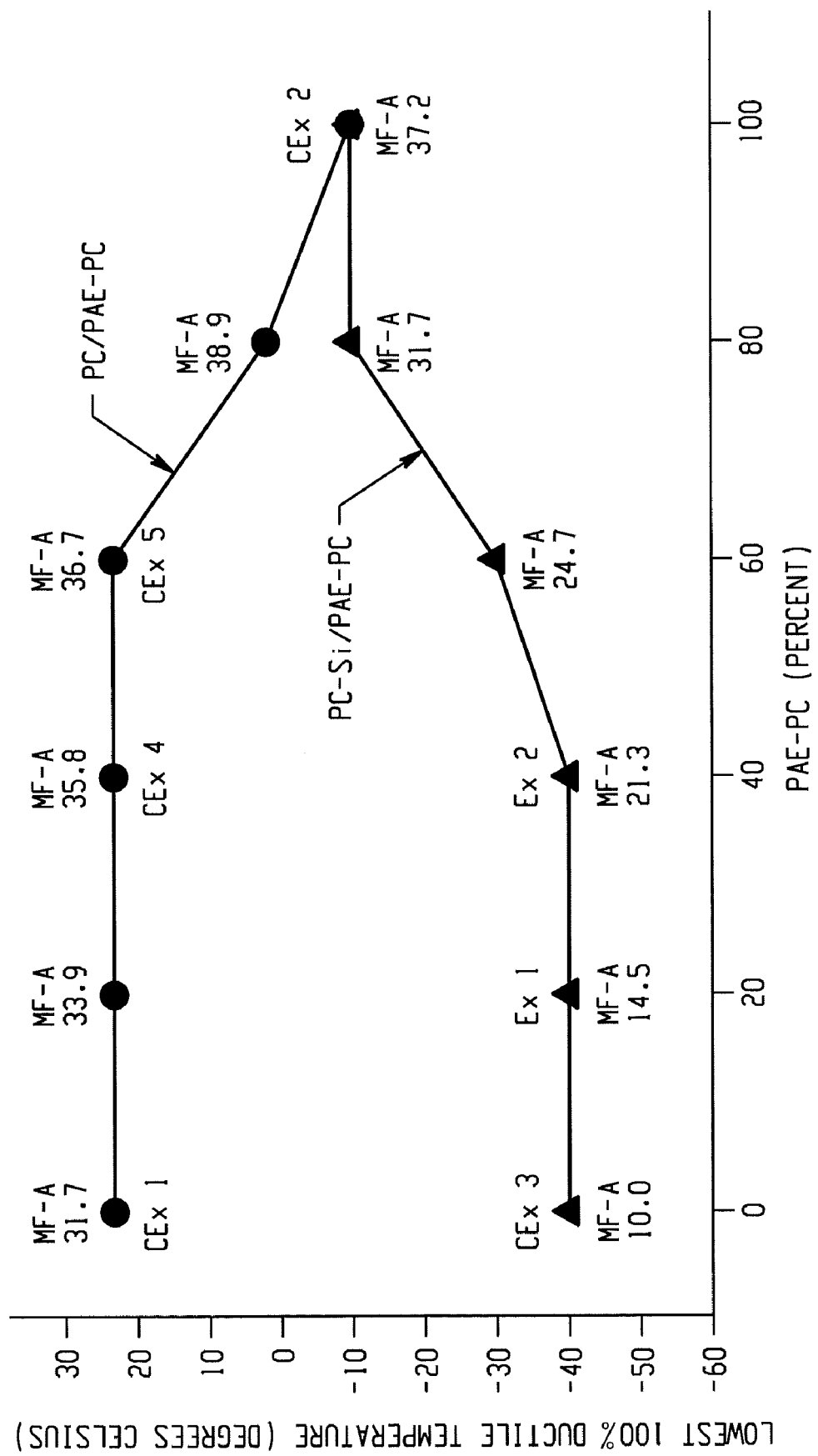
FIG. 1 is a plot of the lowest temperature at which 100% ductility was measured, versus percent by weight for poly (aliphatic ester)-polycarbonate, blended with either bisphenol A polycarbonate homopolymer or with polysiloxane-polycarbonate.

The above described and other features are exemplified by the following detailed description.

DETAILED DESCRIPTION OF THE INVENTION

Surprisingly, it has been found that a thermoplastic composition comprising a poly(aliphatic ester)-polycarbonate copolymer (also referred to herein as a polyester-polycarbonate having soft block units), a polysiloxane-polycarbonate copolymer, and optionally, a polycarbonate not identical to the poly(aliphatic ester)-polycarbonate and polysiloxane-polycarbonate, is useful for applications in which a high degree of mold-filling, as for preparing, for example, transparent thin-wall articles, is required. The thermoplastic composition desirably has having high melt flow (up to about 22 cc/10 min measured under a load of 1.2 Kg and at a temperature of 300° C.) and complete retention of ductility at low temperatures (at least as low as −40° C.), without sacrificing optical, mechanical, thermal and/or melt flow properties.

Also included herein are articles prepared from the thermoplastic compositions. Due to the improved properties of the thermoplastic compositions, which exhibit superior ductility, better melt flow and hence better mold-filling properties, and high transparency without sacrificing other physical properties, articles molded from the thermoplastic compositions have lower stress.

The thermoplastic composition includes a poly(aliphatic ester)-polycarbonate and a polysiloxane-polycarbonate, and may also include a polycarbonate. Generally, as used herein, the terms "polycarbonate" and "polycarbonate resin" mean compositions having repeating structural carbonate units of the formula (1):

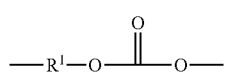

(1)

in which at least 60 percent of the total number of $R^1$ groups are aromatic organic radicals and the balance thereof are aliphatic, alicyclic, or aromatic radicals. In one embodiment, each $R^1$ is an aromatic organic radical, for example a radical of the formula (2):

(2)

wherein each of $A^1$ and $A^2$ is a monocyclic divalent aryl radical and $Y^1$ is a bridging radical having one or two atoms that separate $A^1$ from $A^2$. In an exemplary embodiment, one atom separates $A^1$ from $A^2$. Illustrative non-limiting examples of radicals of this type are —O—, —S—, —S(O)—, —S(O)$_2$—, —C(O)—, methylene, cyclohexylmethylene, 2-[2.2.1]-bicycloheptylidene, ethylidene, isopropylidene, neopentylidene, cyclohexylidene, cyclopentadecylidene, cyclododecylidene, and adamantylidene. The bridging radical $Y^1$ may be a hydrocarbon group or a saturated hydrocarbon group such as methylene, cyclohexylidene, or isopropylidene.

Polycarbonates may be produced by the reaction of dihydroxy compounds having the formula HO—$R^1$—OH, which includes dihydroxy compounds of formula (3):

(3)

wherein $Y^1$, $A^1$ and $A^2$ are as described above. Also included are bisphenol compounds of general formula (4):

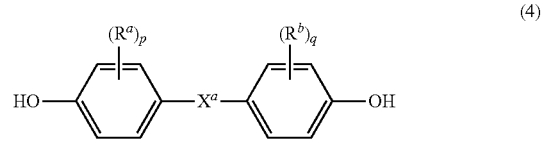

(4)

wherein $R^a$ and $R^b$ each represent a halogen atom or a monovalent hydrocarbon group and may be the same or different; p and q are each independently integers of 0 to 4; and $X^a$ represents one of the groups of formula (5):

(5)

wherein $R^c$ and $R^d$ each independently represent a hydrogen atom or a monovalent linear or cyclic hydrocarbon group and $R^e$ is a divalent hydrocarbon group.

In an embodiment, a heteroatom-containing cyclic alkylidene group comprises at least one heteroatom with a valency of 2 or greater, and at least two carbon atoms. Heteroatoms for use in the heteroatom-containing cyclic alkylidene group include —O—, —S—, and —N(Z)—, where Z is a substituent group selected from hydrogen, hydroxy, $C_{1-12}$ alkyl, $C_{1-12}$ alkoxy, or $C_{1-12}$ acyl. Where present, the cyclic alkylidene group or heteroatom-containing cyclic alkylidene group may have 3 to 20 atoms, and may be a single saturated or unsaturated ring, or fused polycyclic ring system wherein the fused rings are saturated, unsaturated, or aromatic.

Other bisphenols containing substituted or unsubstituted cyclohexane units can be used, for example bisphenols of formula (6):

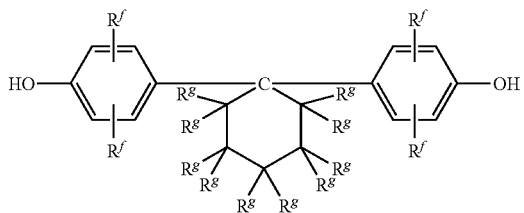

(6)

wherein each $R^f$ is independently hydrogen, $C_{1-12}$ alkyl, or halogen; and each $R^g$ is independently hydrogen or $C_{1-12}$ alkyl. The substituents may be aliphatic or aromatic, straight chain, cyclic, bicyclic, branched, saturated, or unsaturated. Such cyclohexane-containing bisphenols, for example the reaction product of two moles of a phenol with one mole of a hydrogenated isophorone, are useful for making polycarbonate polymers with high glass transition temperatures and high heat distortion temperatures. Cyclohexyl bisphenol containing polycarbonates, or a combination comprising at least one of the foregoing with other bisphenol polycarbonates, are supplied by Bayer Co. under the APEC® trade name.

Other useful dihydroxy compounds having the formula HO—$R^1$—OH include aromatic dihydroxy compounds of formula (7):

(7)

wherein each $R^h$ is independently a halogen atom, a $C_{1-10}$ hydrocarbyl such as a $C_{1-10}$ alkyl group, a halogen substituted $C_{1-10}$ hydrocarbyl such as a halogen-substituted $C_{1-10}$ alkyl group, and n is 0 to 4. The halogen is usually bromine.

Exemplary dihydroxy compounds include the following: 4,4'-dihydroxybiphenyl, 1,6-dihydroxynaphthalene, 2,6-dihydroxynaphthalene, bis(4-hydroxyphenyl)methane, bis(4-hydroxyphenyl)diphenylmethane, bis(4-hydroxyphenyl)-1-naphthylmethane, 1,2-bis(4-hydroxyphenyl)ethane, 1,1-bis(4-hydroxyphenyl)-1-phenylethane, 2-(4-hydroxyphenyl)-2-(3-hydroxyphenyl)propane, bis(4-hydroxyphenyl)phenylmethane, 2,2-bis(4-hydroxy-3-bromophenyl)propane, 1,1-bis (hydroxyphenyl)cyclopentane, 1,1-bis(4-hydroxyphenyl)cyclohexane, 1,1-bis(4-hydroxyphenyl)isobutene, 1,1-bis(4-hydroxyphenyl)cyclododecane, trans-2,3-bis(4-hydroxyphenyl)-2-butene, 2,2-bis(4-hydroxyphenyl)adamantine, (alpha, alpha'-bis(4-hydroxyphenyl)toluene, bis(4-hydroxyphenyl)acetonitrile, 2,2-bis(3-methyl-4-hydroxyphenyl)propane, 2,2-bis(3-ethyl-4-hydroxyphenyl)propane, 2,2-bis(3-n-propyl-4-hydroxyphenyl)propane, 2,2-bis(3-isopropyl-4-hydroxyphenyl)propane, 2,2-bis(3-sec-butyl-4-hydroxyphenyl)propane, 2,2-bis(3-t-butyl-4-hydroxyphenyl)propane, 2,2-bis(3-cyclohexyl-4-hydroxyphenyl)propane, 2,2-bis(3-allyl-4-hydroxyphenyl)propane, 2,2-bis(3-methoxy-4-hydroxyphenyl)propane, 2,2-bis(4-hydroxyphenyl)hexafluoropropane, 1,1-dichloro-2,2-bis(4-hydroxyphenyl)ethylene, 1,1-dibromo-2,2-bis(4-hydroxyphenyl)ethylene, 1,1-dichloro-2,2-bis(5-phenoxy-4-hydroxyphenyl)ethylene, 4,4'-dihydroxybenzophenone, 3,3-bis(4-hydroxyphenyl)-2-butanone, 1,6-bis(4-hydroxyphenyl)-1,6-hexanedione, ethylene glycol bis(4-hydroxyphenyl)ether, bis(4-hydroxyphenyl)ether, bis(4-hydroxyphenyl)sulfide, bis(4-hydroxyphenyl)sulfoxide, bis(4-hydroxyphenyl)sulfone, 9,9-bis(4-hydroxyphenyl)fluorine, 2,7-dihydroxypyrene, 6,6'-dihydroxy-3,3,3',3'-tetramethylspiro(bis)indane ("spirobiindane bisphenol"), 3,3-bis(4-hydroxyphenyl)phthalide, 2,6-dihydroxydibenzo-p-dioxin, 2,6-dihydroxythianthrene, 2,7-dihydroxyphenoxathin, 2,7-dihydroxy-9,10-dimethylphenazine, 3,6-dihydroxydibenzofuran, 3,6-dihydroxydibenzothiophene, and 2,7-dihydroxycarbazole, resorcinol, substituted resorcinol compounds such as 5-methyl resorcinol, 5-ethyl resorcinol, 5-propyl resorcinol, 5-butyl resorcinol, 5-t-butyl resorcinol, 5-phenyl resorcinol, 5-cumyl resorcinol, 2,4,5,6-tetrafluoro resorcinol, 2,4,5,6-tetrabromo resorcinol, or the like; catechol; hydroquinone; substituted hydroquinones such as 2-methyl hydroquinone, 2-ethyl hydroquinone, 2-propyl hydroquinone, 2-butyl hydroquinone, 2-t-butyl hydroquinone, 2-phenyl hydroquinone, 2-cumyl hydroquinone, 2,3,5,6-tetramethyl hydroquinone, 2,3,5,6-tetra-t-butyl hydroquinone, 2,3,5,6-tetrafluoro hydroquinone, 2,3,5,6-tetrabromo hydroquinone, and the like, as well as combinations comprising at least one of the foregoing dihydroxy compounds.

Specific examples of bisphenol compounds that may be represented by formula (3) include 1,1-bis(4-hydroxyphenyl) methane, 1,1-bis(4-hydroxyphenyl)ethane, 2,2-bis(4-hydroxyphenyl)propane (hereinafter "bisphenol A" or "BPA"), 2,2-bis(4-hydroxyphenyl)butane, 2,2-bis(4-hydroxyphenyl) octane, 1,1-bis(4-hydroxyphenyl)propane, 1,1-bis(4-hydroxyphenyl)n-butane, 2,2-bis(4-hydroxy-1-methylphenyl)propane, 1,1-bis(4-hydroxy-t-butylphenyl)propane, 3,3-bis(4-hydroxyphenyl)phthalimidine, 2-phenyl-3,3-bis(4-hydroxyphenyl)phthalimidine (PPPBP), and 1,1-bis(4-hydroxy-3-methylphenyl)cyclohexane (DMBPC). Combinations comprising at least one of the foregoing dihydroxy compounds may also be used.

In a specific embodiment, where a polycarbonate is included, the polycarbonate may be a linear homopolymer derived from bisphenol A, in which each of $A^1$ and $A^2$ is p-phenylene and $Y^1$ is isopropylidene. The polycarbonates generally may have an intrinsic viscosity, as determined in chloroform at 25° C., of 0.3 to 1.5 deciliters per gram (dl/g), specifically 0.45 to 1.0 dl/g. The polycarbonates may have a weight average molecular weight (Mw) of 10,000 to 100,000 g/mol, as measured by gel permeation chromatography (GPC) using a crosslinked styrene-divinyl benzene column, at a sample concentration of 1 milligram per milliliter, and as calibrated with polycarbonate standards.

In an embodiment, the polycarbonate may have a melt volume flow rate (often abbreviated MVR) measures the rate of extrusion of a thermoplastics through an orifice at a prescribed temperature and load. Polycarbonates useful for the formation of articles may have an MVR, measured at 300° C. under a load of 1.2 kg according to ASTM D1238-04 or ISO 1133, of 0.5 to 80 cubic centimeters per 10 minutes (cc/10 min). In a specific embodiment, where a polycarbonate is used in addition to the poly(aliphatic ester)-polycarbonate and the polysiloxane-polycarbonate, the polycarbonate (or a combination of polycarbonates, i.e., a polycarbonate composition) has an MVR measured at 300° C. under a load of 1.2 kg according to ASTM D1238-04 or ISO 1133, of 5 to 35 cc/10 min, specifically 10 to 35 cc/10 min, and more specifically 25 to 35 cc/10 min.

"Polycarbonates" and "polycarbonate resins" as used herein further include homopolycarbonates, copolymers comprising different $R^1$ moieties in the carbonate (referred to herein as "copolycarbonates"), copolymers comprising carbonate units and other types of polymer units, such as ester units, polysiloxane units, and combinations comprising at least one of homopolycarbonates and copolycarbonates. As used herein, "combination" is inclusive of blends, mixtures, alloys, reaction products, and the like. A specific type of copolymer is a polyester carbonate, also known as a polyester-polycarbonate. Such copolymers further contain, in addition to recurring carbonate chain units of the formula (1), units of formula (8):

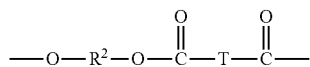

(8)

wherein $R^2$ is a divalent group derived from a dihydroxy compound, and may be, for example, a $C_{2-10}$ alkylene group, a $C_{6-20}$ alicyclic group, a $C_{6-20}$ aromatic group or a polyoxyalkylene group in which the alkylene groups contain 2 to about 6 carbon atoms, specifically 2, 3, or 4 carbon atoms; and T is a divalent group derived from a dicarboxylic acid (aliphatic, aromatic, or alkyl aromatic), and may be, for example, a $C_{4-18}$ aliphatic group, a $C_{6-20}$ alkylene group, a $C_{6-20}$ alkylene group, a $C_{6-20}$ alicyclic group, a $C_{6-20}$ alkyl aromatic group, or a $C_{6-20}$ aromatic group.

$R^2$ may be is a $C_{2-30}$ alkylene group having a straight chain, branched chain, or cyclic (including polycyclic) structure. Alternatively, $R^2$ may be derived from an aromatic dihydroxy compound of formula (4) above, or from an aromatic dihydroxy compound of formula (7) above.

Examples of aromatic dicarboxylic acids that may be used to prepare the polyester units include isophthalic or terephthalic acid, 1,2-di(p-carboxyphenyl)ethane, 4,4'-dicarboxydiphenyl ether, 4,4'-bisbenzoic acid, and combinations comprising at least one of the foregoing acids. Acids containing fused rings can also be present, such as in 1,4-, 1,5-, or 2,6-naphthalenedicarboxylic acids. Specific dicarboxylic acids are terephthalic acid, isophthalic acid, naphthalene dicarboxylic acid, cyclohexane dicarboxylic acid, or combinations thereof. A specific dicarboxylic acid comprises a combination of isophthalic acid and terephthalic acid wherein the weight ratio of isophthalic acid to terephthalic acid is about 91:9 to about 2:98. In another specific embodiment, R is a $C_{2-6}$ alkylene group and T is p-phenylene, m-phenylene, naphthalene, a divalent cycloaliphatic group, or a combination thereof. This class of polyester includes the poly(alkylene terephthalates).

The molar ratio of ester units to carbonate units in the copolymers may vary broadly, for example 1:99 to 99: 1, specifically 10:90 to 90: 10, more specifically 25:75 to 75:25, depending on the desired properties of the final composition.

In an embodiment, the thermoplastic composition comprises a polyester-polycarbonate copolymer, and specifically a polyester-polycarbonate copolymer in which the ester units of formula (8) comprise soft block ester units, also referred to herein as aliphatic dicarboxylic acid ester units. Such a polyester-polycarbonate copolymer comprising soft block ester units is also referred to herein as a poly(aliphatic ester)-polycarbonate. The soft block ester unit can be a $C_{6-20}$ aliphatic dicarboxylic acid ester unit (where $C_{6-20}$ includes the terminal carboxyl groups), and may be straight chain (i.e., unbranched) or branched chain dicarboxylic acids, cycloalkyl or cycloalkylidene-containing dicarboxylic acids units, or combinations of these structural units. In an embodiment, the $C_{6-20}$ aliphatic dicarboxylic acid ester unit includes a straight chain alkylene group comprising methylene ($-CH_2-$) repeating units. In a specific embodiment, a useful soft block ester unit comprises units of formula (8a):

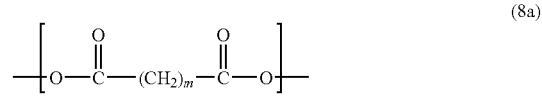

where m is 4 to 18. In a specific embodiment of formula (8a), m is 8 to 10. The poly(aliphatic ester)-polycarbonate can include less than or equal to 25 wt % of the soft block unit. In an embodiment, a poly(aliphatic ester)-polycarbonate comprises units of formula (8a) in an amount of 1 to 10 wt %, specifically 2 to 9 wt %, and more specifically 3 to 8 wt %, based on the total weight of the poly(aliphatic ester)-polycarbonate. Also in an embodiment, the soft block ester has a glass transition temperature of 128 to 139° C., specifically 130 to 139° C.

The poly(aliphatic ester)-polycarbonate is a copolymer of soft block ester units with carbonate units. The poly(aliphatic ester)-polycarbonate is shown in formula (8b):

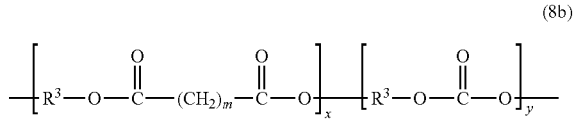

where each $R^3$ is independently derived from a dihydroxyaromatic compound of formula (4) or (7), m is 4 to 18, and x and y each represent average weight percentages of the poly(aliphatic ester)-polycarbonate where the average weight percentage ratio x:y is 10:90 to 1:99, specifically 9:91 to 2:98, and more specifically 8:92 to 3:97, where x+y is 100.

Soft block ester units, as defined herein, can be derived from an alpha, omega $C_{6-20}$ aliphatic dicarboxylic acid or a reactive derivative thereof. In a specific embodiment, the carboxylate portion of the aliphatic ester unit of formula (8a), in which the terminal carboxylate groups are connected by a chain of repeating methylene ($-CH_2-$) units (where m is as defined for formula (8a)), is derived from the corresponding dicarboxylic acid or reactive derivative thereof, such as the acid halide (specifically, the acid chloride), an ester, or the like. Exemplary alpha, omega dicarboxylic acids (from which the corresponding acid chlorides may be derived) include alpha, omega $C_6$ dicarboxylic acids such as hexanedioic acid (also referred to as adipic acid); alpha, omega $C_{10}$ dicarboxylic acids such as decanedioic acid (also referred to as sebacic acid); and alpha, omega $C_{12}$ dicarboxylic acids such as dodecanedioic acid (sometimes abbreviated as DDDA). It will be appreciated that the aliphatic dicarboxylic acid is not limited to these exemplary carbon chain lengths, and that other chain lengths within the $C_{6-20}$ limitation may be used. A specific embodiment of the poly(aliphatic ester)-polycarbonate having soft block ester units comprising a straight chain methylene group and a bisphenol A polycarbonate group is shown in formula (8c):

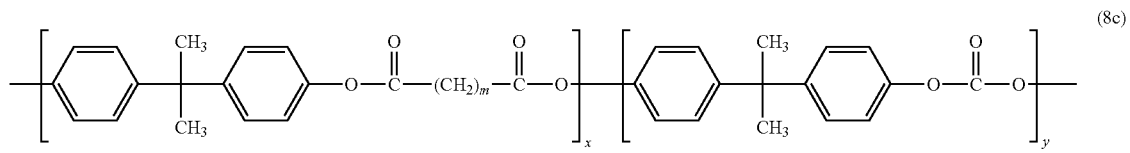

where m is 4 to 18 and x and y are as defined for formula (8b). In a specific exemplary embodiment, a useful poly(aliphatic ester)-polycarbonate copolymer comprises sebacic acid ester units and bisphenol A carbonate units (formula (8c), where m is 8, and the average weight ratio of x:y is 6:94).

Polycarbonates can be manufactured by processes such as interfacial polymerization and melt polymerization. Although the reaction conditions for interfacial polymerization may vary, an exemplary process generally involves dissolving or dispersing a dihydric phenol reactant in aqueous caustic soda or potash, adding the resulting mixture to a suitable water-immiscible solvent medium, and contacting the reactants with a carbonate precursor in the presence of a catalyst such as triethylamine or a phase transfer catalyst, under controlled pH conditions, e.g., about 8 to about 10. The most commonly used water immiscible solvents include methylene chloride, 1,2-dichloroethane, chlorobenzene, toluene, and the like.

Carbonate precursors include, for example, a carbonyl halide such as carbonyl bromide or carbonyl chloride, or a haloformate such as a bishaloformates of a dihydric phenol (e.g., the bischloroformates of bisphenol A, hydroquinone, or the like) or a glycol (e.g., the bishaloformate of ethylene glycol, neopentyl glycol, polyethylene glycol, or the like). Combinations comprising at least one of the foregoing types of carbonate precursors may also be used. In an exemplary embodiment, an interfacial polymerization reaction to form carbonate linkages uses phosgene as a carbonate precursor, and is referred to as a phosgenation reaction.

Among the phase transfer catalysts that may be used are catalysts of the formula $(R^3)_4Q^+X$, wherein each $R^3$ is the same or different, and is a $C_{1-10}$ alkyl group; Q is a nitrogen or phosphorus atom; and X is a halogen atom or a $C_{1-8}$ alkoxy group or $C_{6-18}$ aryloxy group. Useful phase transfer catalysts include, for example, $[CH_3(CH_2)_3]_4NX$, $[CH_3(CH_2)_3]_4PX$, $[CH_3(CH_2)_5]_4NX$, $[CH_3(CH_2)_6]_4NX$, $[CH_3(CH_2)_4]_4NX$, $CH_3[CH_3(CH_2)_3]_3NX$, and $CH_3[CH_3(CH_2)_2]_3NX$, wherein X is Cl⁻, Br⁻, a $C_{1-8}$ alkoxy group or a $C_{6-18}$ aryloxy group. An effective amount of a phase transfer catalyst may be about 0.1 to about 10 wt % based on the weight of bisphenol in the phosgenation mixture. In another embodiment an effective amount of phase transfer catalyst may be about 0.5 to about 2 wt % based on the weight of bisphenol in the phosgenation mixture.

All types of polycarbonate end groups are contemplated as being useful in the polycarbonate composition, provided that such end groups do not significantly adversely affect desired properties of the compositions.

Branched polycarbonate blocks may be prepared by adding a branching agent during polymerization. These branching agents include polyfunctional organic compounds containing at least three functional groups selected from hydroxyl, carboxyl, carboxylic anhydride, haloformyl, and mixtures of the foregoing functional groups. Specific examples include trimellitic acid, trimellitic anhydride, trimellitic trichloride, tris-p-hydroxy phenyl ethane, isatin-bis-phenol, tris-phenol TC (1,3,5-tris((p-hydroxyphenyl)isopropyl)benzene), tris-phenol PA (4(4(1,1-bis(p-hydroxyphenyl)-ethyl)alpha, alpha-dimethyl benzyl) phenol), 4-chloroformyl phthalic anhydride, trimesic acid, and benzophenone tetracarboxylic acid. The branching agents may be added at a level of about 0.05 to about 2.0 wt %. Mixtures comprising linear polycarbonates and branched polycarbonates may be used.

A chain stopper (also referred to as a capping agent) may be included during polymerization. The chain stopper limits molecular weight growth rate, and so controls molecular weight in the polycarbonate. Exemplary chain stoppers include certain mono-phenolic compounds, mono-carboxylic acid chlorides, and/or mono-chloroformates. Mono-phenolic chain stoppers are exemplified by monocyclic phenols such as phenol and $C_1$-$C_{22}$ alkyl-substituted phenols such as p-cumyl-phenol, resorcinol monobenzoate, and p-and tertiary-butyl phenol; and monoethers of diphenols, such as p-methoxyphenol. Alkyl-substituted phenols with branched chain alkyl substituents having 8 to 9 carbon atom may be specifically mentioned. Certain mono-phenolic UV absorbers may also be used as a capping agent, for example 4-substituted-2-hydroxybenzophenones and their derivatives, aryl salicylates, monoesters of diphenols such as resorcinol monobenzoate, 2-(2-hydroxyaryl)-benzotriazoles and their derivatives, 2-(2-hydroxyaryl)-1,3,5-triazines and their derivatives, and the like.

Mono-carboxylic acid chlorides may also be used as chain stoppers. These include monocyclic, mono-carboxylic acid chlorides such as benzoyl chloride, $C_1$-$C_{22}$ alkyl-substituted benzoyl chloride, toluoyl chloride, halogen-substituted benzoyl chloride, bromobenzoyl chloride, cinnamoyl chloride, 4-nadimidobenzoyl chloride, and combinations thereof; polycyclic, mono-carboxylic acid chlorides such as trimellitic anhydride chloride, and naphthoyl chloride; and combinations of monocyclic and polycyclic mono-carboxylic acid chlorides. Chlorides of aliphatic monocarboxylic acids with less than or equal to about 22 carbon atoms are useful. Functionalized chlorides of aliphatic monocarboxylic acids, such as acryloyl chloride and methacryoyl chloride, are also useful. Also useful are mono-chloroformates including monocyclic, mono-chloroformates, such as phenyl chloroformate, alkyl-substituted phenyl chloroformate, p-cumyl phenyl chloroformate, toluene chloroformate, and combinations thereof.

Alternatively, melt processes may be used to make the polycarbonates. Generally, in the melt polymerization process, polycarbonates may be prepared by co-reacting, in a molten state, the dihydroxy reactant(s) and a diaryl carbonate ester, such as diphenyl carbonate, in the presence of a transesterification catalyst in a BANBURY® mixer, twin screw extruder, or the like to form a uniform dispersion. Volatile monohydric phenol is removed from the molten reactants by distillation and the polymer is isolated as a molten residue. A specifically useful melt process for making polycarbonates uses a diaryl carbonate ester having electron-withdrawing substituents on the aryls. Examples of specifically useful diaryl carbonate esters with electron withdrawing substituents include bis(4-nitrophenyl)carbonate, bis(2-chlorophenyl)carbonate, bis(4-chlorophenyl)carbonate, bis(methyl salicyl)carbonate, bis(4-methylcarboxylphenyl)carbonate, bis(2-acetylphenyl)carboxylate, bis(4-acetylphenyl)carboxylate, or a combination comprising at least one of the foregoing. In addition, transesterification catalysts for use may include phase transfer catalysts of formula $(R^3)_4Q^+X$ above, wherein each $R^3$, Q, and X are as defined above. Examples of transesterification catalysts include tetrabutylammonium hydroxide, methyltributylammonium hydroxide, tetrabutylammonium acetate, tetrabutylphosphonium hydroxide, tetrabutylphosphonium acetate, tetrabutylphosphonium phenolate, or a combination comprising at least one of the foregoing.

The polyester-polycarbonates, including the poly(aliphatic ester)-polycarbonates, may also be prepared by interfacial polymerization. Rather than utilizing the dicarboxylic acid (such as the alpha, omega $C_{6-20}$ aliphatic dicarboxylic acid) per se, it is possible, and sometimes even preferred, to employ the reactive derivatives of the dicarboxylic acid, such as the corresponding dicarboxylic acid halides, and in particular the acid dichlorides and the acid dibromides. Thus, for example instead of using isophthalic acid, terephthalic acid, or a combination comprising at least one of the foregoing (for poly (arylate ester)-polycarbonates), it is possible to employ isophthaloyl dichloride, terephthaloyl dichloride, and a combination comprising at least one of the foregoing. Similarly, for the poly(aliphatic ester)-polycarbonates, it is possible, and even desirable, to use for example acid chloride derivatives such as a $C_6$ dicarboxylic acid chloride (adipoyl chloride), a $C_{10}$ dicarboxylic acid chloride (sebacoyl chloride), or a $C_{12}$ dicarboxylic acid chloride (dodecanedioyl chloride). The dicarboxylic acid or reactive derivative may be condensed with the dihydroxyaromatic compound in a first condensation, followed by in situ phosgenation to generate the carbonate linkages with the dihydroxyaromatic compound. Alternatively, the dicarboxylic acid or derivative may be condensed with the dihydroxyaromatic compound simultaneously with phosgenation.

In addition to the polycarbonates described above, combinations of the polycarbonate with other thermoplastic polymers, for example combinations of homopolycarbonates and/or polycarbonate copolymers with polyesters, may be used. Useful polyesters may include, for example, polyesters having repeating units of formula (8), which include poly(alkylene dicarboxylates), liquid crystalline polyesters, and polyester copolymers. The polyesters described herein are generally completely miscible with the polycarbonates when blended.

The polyesters may be obtained by interfacial polymerization or melt-process condensation as described above, by solution phase condensation, or by transesterification polymerization wherein, for example, a dialkyl ester such as dimethyl terephthalate may be transesterified with ethylene glycol using acid catalysis, to generate poly(ethylene terephthalate). It is possible to use a branched polyester in which a branching agent, for example, a glycol having three or more hydroxyl groups or a trifunctional or multifunctional carboxylic acid has been incorporated. Furthermore, it is sometime desirable to have various concentrations of acid and hydroxyl end groups on the polyester, depending on the ultimate end use of the composition.

Polyesters, where included in a blend with a polycarbonate, may include aromatic polyesters, poly(alkylene esters) including poly(alkylene arylates), and poly(cycloalkylene diesters). Aromatic polyesters may have a polyester structure according to formula (8), wherein D and T are each aromatic groups as described hereinabove. In an embodiment, useful aromatic polyesters may include, for example, poly(isophthalate-terephthalate-resorcinol)esters, poly(isophthalate-terephthalate-bisphenol A)esters, poly[(isophthalate-terephthalate-resorcinol)ester-co-(isophthalate-terephthalate-bisphenol A)]ester, or a combination comprising at least one of these. Also contemplated are aromatic polyesters with a minor amount, e.g., about 0.5 to about 10 wt %, based on the total weight of the polyester, of units derived from an aliphatic diacid and/or an aliphatic polyol to make copolyesters. Poly (alkylene arylates) may have a polyester structure according to formula (8), wherein T comprises groups derived from aromatic dicarboxylates, cycloaliphatic dicarboxylic acids, or derivatives thereof. Examples of specifically useful T groups include 1,2-, 1,3-, and 1,4-phenylene; 1,4- and 1,5-naphthylenes; cis- or trans-1,4-cyclohexylene; and the like. Specifically, where T is 1,4-phenylene, the poly(alkylene arylate) is a poly(alkylene terephthalate). In addition, for poly (alkylene arylate), specifically useful alkylene groups D include, for example, ethylene, 1,4-butylene, and bis-(alkylene-disubstituted cyclohexane) including cis- and/or trans-1,4-(cyclohexylene)dimethylene. Examples of poly(alkylene terephthalates) include poly(ethylene terephthalate) (PET), poly(1,4-butylene terephthalate) (PBT), and poly(propylene terephthalate) (PPT). Also useful are poly(alkylene naphthoates), such as poly(ethylene naphthanoate) (PEN), and poly(butylene naphthanoate) (PBN). A useful poly(cycloalkylene diester) is poly(cyclohexanedimethylene terephthalate) (PCT). Combinations comprising at least one of the foregoing polyesters may also be used.

Copolymers comprising alkylene terephthalate repeating ester units with other ester groups may also be useful. Useful ester units may include different alkylene terephthalate units, which can be present in the polymer chain as individual units, or as blocks of poly(alkylene terephthalates). Specific examples of such copolymers include poly(cyclohexanedimethylene terephthalate)-co-poly(ethylene terephthalate), abbreviated as PETG where the polymer comprises greater than or equal to 50 mol % of poly(ethylene terephthalate), and abbreviated as PCTG where the polymer comprises greater than 50 mol % of poly(1,4-cyclohexanedimethylene terephthalate).

Poly(cycloalkylene diester)s may also include poly(alkylene cyclohexanedicarboxylate)s. Of these, a specific example is poly(1,4-cyclohexane-dimethanol-1,4-cyclohexanedicarboxylate) (PCCD), having recurring units of formula (9):

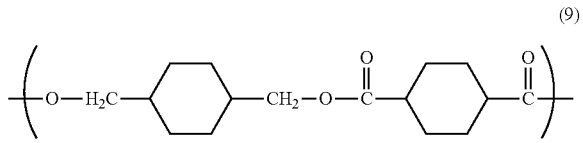

wherein, as described using formula (8), $R^2$ is a 1,4-cyclohexanedimethylene group derived from 1,4-cyclohexanedimethanol, and T is a cyclohexane ring derived from cyclohexanedicarboxylate or a chemical equivalent thereof, and may comprise the cis-isomer, the trans-isomer, or a combination comprising at least one of the foregoing isomers.

Polyester-polycarbonate copolymers generally may have a weight average molecular weight ($M_w$) of 1,500 to 100,000 g/mol, specifically 1,700 to 50,000 g/mol. In an embodiment, poly(aliphatic ester)-polycarbonates have a molecular weight of 15,000 to 45,000 g/mol, specifically 17,000 to 40,000 g/mol, more specifically 20,000 to 30,000 g/mol, and still more specifically 20,000 to 25,000 g/mol. Molecular weight determinations are performed using gel permeation chromatography (GPC), using a crosslinked styrene-divinylbenzene column and calibrated to polycarbonate references. Samples are prepared at a concentration of about 1 mg/ml, and are eluted at a flow rate of about 1.0 ml/min.

A polyester-polycarbonate may in general have an MVR of about 5 to about 150 cc/10 min., specifically about 7 to about 125 cc/10 min, more specifically about 9 to about 110 cc/10 min, and still more specifically about 10 to about 100 cc/10 min., measured at 300° C. and a load of 1.2 kilograms according to ASTM D1238-04. Commercial polyester blends with polycarbonate are marketed under the trade name XYLEX®, including for example XYLEX® X7300, and commercial polyester-polycarbonates are marketed under the tradename LEXAN® SLX polymers, including for example LEXAN® SLX-9000, and are available from SABIC Innovative Plastics (formerly GE Plastics).

In an embodiment, poly(aliphatic ester)-polycarbonates have an MVR of about 35 to about 45 cc/10 min, and more specifically about 35 to about 40 cc/10 min, measured at 300° C. and under a load of 1.2 kilograms according to ASTM D1238-04.

In an embodiment, the thermoplastic composition comprises poly(aliphatic ester)-polycarbonate in an amount of 10 to 65 wt %, specifically 20 to 65 wt %, more specifically 30 to 65 wt %, based on the total weight of poly(aliphatic ester)-polycarbonate and polysiloxane-polycarbonate. In another embodiment, the thermoplastic composition comprises poly(aliphatic ester)-polycarbonate in an amount of 10 to 45 wt %, specifically 20 to 45 wt %, and more specifically 30 to 45 wt %, based on the total weight of poly(aliphatic ester)-polycarbonate and polysiloxane-polycarbonate.

The thermoplastic composition comprises a polysiloxane-polycarbonate copolymer, also referred to as a polysiloxane-polycarbonate. The polysiloxane (also referred to herein as "polydiorganosiloxane") blocks of the copolymer comprise repeating siloxane units (also referred to herein as "diorganosiloxane units") of formula (10):

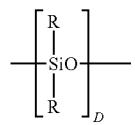

(10)

wherein each occurrence of R is same or different, and is a $C_{1-13}$ monovalent organic radical. For example, R may independently be a $C_1$-$C_{13}$ alkyl group, $C_1$-$C_{13}$ alkoxy group, $C_2$-$C_{13}$ alkenyl group, $C_2$-$C_{13}$ alkenyloxy group, $C_3$-$C_6$ cycloalkyl group, $C_3$-$C_6$ cycloalkoxy group, $C_6$-$C_{14}$ aryl group, $C_6$-$C_{10}$ aryloxy group, $C_7$-$C_{13}$ arylalkyl group, $C_7$-$C_{13}$ arylalkoxy group, $C_7$-$C_{13}$ alkylaryl group, or $C_7$-$C_{13}$ alkylaryloxy group. The foregoing groups may be fully or partially halogenated with fluorine, chlorine, bromine, or iodine, or a combination thereof. Combinations of the foregoing R groups may be used in the same copolymer.

The value of D in formula (10) may vary widely depending on the type and relative amount of each component in the thermoplastic composition, the desired properties of the composition, and like considerations. Generally, D may have an average value of 2 to 1,000, specifically 2 to 500, more specifically 5 to 100. In a specific embodiment, D has an average value of 30 to 60, specifically 40 to 60. In an exemplary embodiment, D has an average value of 45.

Where D is of a lower value, e.g., less than 40, it may be desirable to use a relatively larger amount of the polycarbonate-polysiloxane copolymer. Conversely, where D is of a higher value, e.g., greater than 40, it may be necessary to use a relatively lower amount of the polycarbonate-polysiloxane copolymer.

A combination of a first and a second (or more) polysiloxane-polycarbonate copolymer may be used, wherein the average value of D of the first copolymer is less than the average value of D of the second copolymer.

In one embodiment, the polydiorganosiloxane blocks are provided by repeating structural units of formula (11):

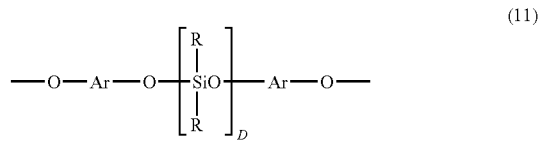

(11)

wherein D is as defined above; each R may independently be the same or different, and is as defined above; and each Ar may independently be the same or different, and is a substituted or unsubstituted $C_6$-$C_{30}$ arylene radical, wherein the bonds are directly connected to an aromatic moiety. Useful Ar groups in formula (11) may be derived from a $C_6$-$C_{30}$ dihydroxyarylene compound, for example a dihydroxyarylene compound of formula (3), (4), or (7) above. Combinations comprising at least one of the foregoing dihydroxyarylene compounds may also be used. Specific examples of dihydroxyarylene compounds are 1,1-bis(4-hydroxyphenyl) methane, 1,1-bis(4-hydroxyphenyl)ethane, 2,2-bis(4-hydroxyphenyl)propane, 2,2-bis(4-hydroxyphenyl)butane, 2,2-bis(4-hydroxyphenyl)octane, 1,1-bis(4-hydroxyphenyl) propane, 1,1-bis(4-hydroxyphenyl)n-butane, 2,2-bis(4-hydroxy-1-methylphenyl)propane, 1,1-bis(4-hydroxyphenyl)cyclohexane, bis(4-hydroxyphenyl sulphide), and 1,1-bis(4-hydroxy-t-butylphenyl)propane. Combinations comprising at least one of the foregoing dihydroxy compounds may also be used.

Units of formula (11) may be derived from the corresponding dihydroxy compound of formula (12):

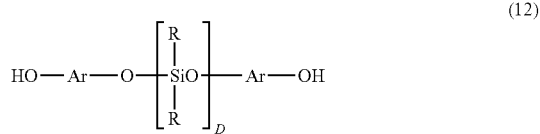

(12)

wherein R, Ar, and D are as described above. Compounds of formula (12) may be obtained by the reaction of a dihydroxyarylene compound with, for example, an alpha, omega-bisacetoxypolydiorangonosiloxane under phase transfer conditions.

In another embodiment, polydiorganosiloxane blocks comprise units of formula (13):

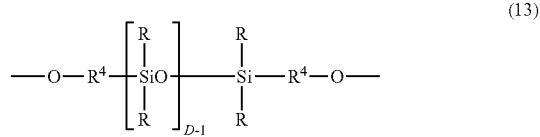

(13)

wherein R and D are as described above, and each occurrence of $R^4$ is independently a divalent $C_1$-$C_{30}$ alkylene, and wherein the polymerized polysiloxane unit is the reaction residue of its corresponding dihydroxy compound. In a specific embodiment, the polydiorganosiloxane blocks are provided by repeating structural units of formula (14):

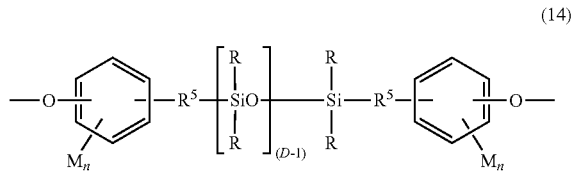
(14)

wherein R and D are as defined above. Each $R^5$ in formula (14) is independently a divalent $C_2$-$C_8$ aliphatic group. Each M in formula (14) may be the same or different, and may be a halogen, cyano, nitro, $C_1$-$C_8$ alkylthio, $C_1$-$C_8$ alkyl, $C_1$-$C_8$ alkoxy, $C_2$-$C_8$ alkenyl, $C_2$-$C_8$ alkenyloxy group, $C_3$-$C_8$ cycloalkyl, $C_3$-$C_8$ cycloalkoxy, $C_6$-CIO aryl, $C_6$-$C_{10}$ aryloxy, $C_7$-$C_{12}$ arylalkyl, $C_7$-$C_{12}$ arylalkoxy, $C_7$-$C_{12}$ alkylaryl, or $C_7$-$C_{12}$ alkylaryloxy, wherein each n is independently 0, 1, 2, 3, or 4.

In one embodiment, M is bromo or chloro, an alkyl group such as methyl, ethyl, or propyl, an alkoxy group such as methoxy, ethoxy, or propoxy, or an aryl group such as phenyl, chlorophenyl, or tolyl; $R^5$ is a dimethylene, trimethylene or tetramethylene group; and R is a $C_{1-8}$ alkyl, haloalkyl such as trifluoropropyl, cyanoalkyl, or aryl such as phenyl, chlorophenyl or tolyl. In another embodiment, R is methyl, or a mixture of methyl and trifluoropropyl, or a mixture of methyl and phenyl. In still another embodiment, M is methoxy, n is one, $R^5$ is a divalent $C_1$-$C_3$ aliphatic group, and R is methyl.

Units of formula (14) may be derived from the corresponding dihydroxy polydiorganosiloxane (15):

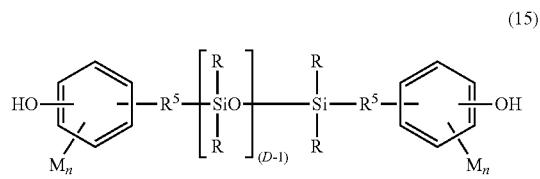
(15)

wherein R, D, M, $R^5$, and n are as described above. Such dihydroxy polysiloxanes can be made by effecting a platinum catalyzed addition between a siloxane hydride of formula (16):

(16)

wherein R and D are as previously defined, and an aliphatically unsaturated monohydric phenol. Useful aliphatically unsaturated monohydric phenols included, for example, eugenol, 2-allylphenol, 4-allyl-2-methylphenol, 4-allyl-2-phenylphenol, 4-allyl-2-bromophenol, 4-allyl-2-t-butoxyphenol, 4-phenyl-2-phenylphenol, 2-methyl-4-propylphenol, 2-allyl-4,6-dimethylphenol, 2-allyl-4-bromo-6-methylphenol, 2-allyl-6-methoxy-4-methylphenol and 2-allyl-4,6-dimethylphenol. Mixtures comprising at least one of the foregoing may also be used.

The polysiloxane-polycarbonate comprises 50 to 99.9 wt % of carbonate units and 0.1 to 50 wt % siloxane units, based on the total weight of the polysiloxane-polycarbonate. In a specific embodiment, the polysiloxane-polycarbonate copolymer comprises 90 to 99 wt %, more specifically 92 to 98 wt %, still more specifically 93 to 97 wt %, and still more specifically 93 to 96 wt % of carbonate units and 1 to 10 wt %, specifically 2 to 8 wt %, more specifically 3 to 7 wt %, and still more specifically 4 to 7 wt % siloxane units. In an exemplary embodiment the polysiloxane-polycarbonate comprises about 6 wt % siloxane units. In another specific embodiment, the polysiloxane-polycarbonate copolymer comprises 75 to 99 wt %, more specifically 75 to 90 wt %, still more specifically 75 to 85 wt % of carbonate units and 1 to 25 wt %, specifically 10 to 25 wt %, more specifically 15 to 25 wt % siloxane units. In another exemplary embodiment the polysiloxane-polycarbonate comprises about 20 wt % siloxane units. All references to weight percent compositions in the polysiloxane-polycarbonate are based on the total weight of the polysiloxane-polycarbonate.

In an embodiment, the polysiloxane-polycarbonate comprises polysiloxane units, and carbonate units derived from bisphenol A, e.g., the dihydroxy compound of formula (3) in which each of $A^1$ and $A^2$ is p-phenylene and $Y^1$ is isopropylidene. Polysiloxane-polycarbonates may have a weight average molecular weight of 2,000 to 100,000 g/mol, specifically 5,000 to 50,000 g/mol. In an embodiment, polysiloxane-polycarbonates have a molecular weight of 15,000 to 45,000 g/mol, specifically 17,000 to 40,000 g/mol, more specifically 20,000 to 30,000 g/mol, and still more specifically 20,000 to 25,000 g/mol. Molecular weights are as measured by gel permeation chromatography using a crosslinked styrene-divinyl benzene column, at a sample concentration of 1 milligram per milliliter, and as calibrated with polycarbonate standards.

The polysiloxane-polycarbonate can have a melt volume flow rate, measured at 300° C. under a load of 1.2 kg, of 1 to 50 cc/10 min, specifically 2 to 30 cc/10 min. In an embodiment, the polysiloxane-polycarbonate has a melt volume rate measured at 300° C. under a load of 1.2 kg, of 5 to 15 cc/10 min, specifically 6 to 14 cc/10 min, and specifically 8 to 12 cc/10 min. Mixtures of polysiloxane-polycarbonates of different flow properties may be used to achieve the overall desired flow property. In an embodiment, exemplary polysiloxane-polycarbonates are marketed under the trade name LEXAN® EXL polycarbonates, available from SABIC Innovative Plastics (formerly GE Plastics).

In an embodiment, the thermoplastic composition comprises polysiloxane-polycarbonate in an amount of 35 to 90 wt %, specifically 35 to 80 wt %, more specifically 35 to 70 parts by weight, based on the total weight of poly(aliphatic ester)-polycarbonate, polysiloxane-polycarbonate, and any added polycarbonate. In another embodiment, the thermoplastic composition comprises polysiloxane-polycarbonate in an amount of 55 to 90 wt %, specifically 55 to 80 wt %, more specifically 55 to 70 parts by weight, based on the total weight of poly(aliphatic ester)-polycarbonate, polysiloxane-polycarbonate, and any added polycarbonate.

In an embodiment, the thermoplastic composition has a soft block content (i.e., an alpha, omega $C_{6-20}$ dicarboxylic acid ester unit content) of 1 to 10 wt %, specifically 2 to 9 wt %, and more specifically 3 to 8 wt %, based on the total weight of the polysiloxane-polycarbonate copolymer and poly(aliphatic ester)-polycarbonate copolymer.

Also in an embodiment, the thermoplastic composition has a siloxane content of 1 to 6 wt %, specifically 2 to 5 wt %, more specifically 3 to 5 wt %, and still more specifically 3 to 4 wt % siloxane units, based on the total weight of the thermoplastic composition.

The thermoplastic composition disclosed herein comprises two different polycarbonate-based materials, a polysiloxane-polycarbonate and a poly(aliphatic ester)-polycarbonate. The thermoplastic composition may further include a polycarbonate different from the polysiloxane-polycarbonate and poly(aliphatic ester)-polycarbonate.

The polysiloxane-polycarbonate includes blocks of siloxane units (i.e., polysiloxane blocks), such as, for example, polydimethylsiloxane units as described hereinabove. Inclusion of blocks of siloxane units in the polycarbonate chain act to increase the flexibility (degrees of freedom of motion) of the chain, and provide superior impact properties, including ductility retention, especially at temperatures as low as −60° C. The impact and ductility retention properties of a polysiloxane-polycarbonate depend upon the amount of siloxane (as a weight percentage of the polysiloxane-polycarbonate) and the average number of repeating siloxane units in the polysiloxane block.

Also, depending upon on the domain size (i.e., the dimensions of regions of siloxane within the copolymer), copolymer architecture, overall concentration of siloxane units and average block lengths of siloxane units in the polycarbonate chain, polysiloxane-polycarbonates can also be either transparent or opaque. Such polymers are commercially available under the LEXAN® EXL tradename, and can be obtained as both transparent and opaque grades having different MVR values and low temperature ductility performances. An exemplary transparent grade has an MVR of 10 cc/10 min (300° C., 1.2 Kg load) and is 100% ductile at a temperature of −40° C. Opaque compositions are also commercially available with 100% ductility performance to temperatures as low as −60° C. at with an MVR of 10 cc/10 min. However, since these compositions are opaque, their utility in blends is limited to non-transparent uses.

While polysiloxane-polycarbonates have excellent (100%) ductility retention at temperatures as low as −60° C., depending upon the amount of siloxane units and the average number of repeating siloxane units in a polysiloxane block, the MVR of polysiloxane-polycarbonates is generally low (i.e., less than about 15 cc/10 min) for molecular weights at which desirable mechanical properties such as impact strength are obtained (e.g., Mw of 20,000 to 25,000 g/mol), and hence cannot meet the necessary mold-filling requirements.

The poly(aliphatic ester)-polycarbonate copolymer, as described above, is a polycarbonate having aliphatic dicarboxylic acid ester soft block units randomly incorporated along the copolymer chain. The introduction of the soft block segment (e.g., a flexible chain of repeating —$CH_2$— units) in the polymer chain of a polycarbonate reduces the glass-transition temperatures (Tg) of the resulting soft block containing polycarbonate copolymer. These materials are generally transparent and have higher MVR than polycarbonate homopolymers or copolymers without the soft block. It has been found that the poly(aliphatic ester)-polycarbonate copolymer thus has excellent, high flow (MVR) properties (up to 45 cc/10 min or higher) but does not possess the necessary low temperature ductility at temperatures of less than about −10° C. (where poly(aliphatic ester)-polycarbonates are typically completely brittle at −40° C.), and hence their impact performance is undesirably low.

Surprisingly however, a high flow, ductile, transparent thermoplastic composition meeting or exceeding the desired performance requirements (i.e., transparency, retention of ductility to temperatures as low as −40° C., and an MVR of up to 22 cc/10 min at 300° C. under a load of 1.2 Kg), comprises a blend of the polysiloxane-polycarbonate and poly(aliphatic ester)-polycarbonate. The thermoplastic composition also desirably has a high transparency of greater than or equal to 85%, 100% ductility at temperatures as low as −40° C., and an MVR of up to 22 cc/10 min (at 300° C. under a load of 1.2 Kg).

While the soft block units of the poly(aliphatic ester)-polycarbonate copolymers may not be specifically limited to the alpha, omega $C_{6-20}$ dicarboxylic acids disclosed herein, it is believed that shorter soft block chain lengths (less than $C_6$, including the carboxylic acid groups) may not provide sufficient chain flexibility in the poly(aliphatic ester)-polycarbonate to increase the MVR to the desired levels (i.e., greater than or equal to about 25 cc/10 min at 300° C. and 1.2 Kg load); likewise, increasing the soft block chain lengths (greater than $C_{20}$, including the carboxylic acid groups) may result in creation of crystalline domains within the poly(aliphatic ester)-polycarbonate composition, which in turn can lead to phase separation of the domains that can manifest as reduced transparency and increased haze, and may affect the thermal properties such as Tg (where multiple Tg values may result for different phase separated domains) and MVR (increasing MVR to excessively high values of greater than about 50 cc/10 min at 300° C. and 1.2 Kg load).

The blends of polysiloxane-polycarbonate copolymer and poly(aliphatic ester)-polycarbonate copolymer to obtain the thermoplastic composition can also be processed at slightly lower temperature (e.g., less than 300° C.) due to the reduced glass transition temperature of the thermoplastic composition relative to the component copolymers used to prepare the thermoplastic composition. In an embodiment, the thermoplastic composition has a glass transition temperature (Tg) of 135 to 150° C., specifically 140 to 149° C., and more specifically 143 to 147° C.

In some embodiments of the thermoplastic composition, for example where the poly(aliphatic ester)-polycarbonate is used in amounts of up to 45 wt % (based on the total weight of polysiloxane-polycarbonate and poly(aliphatic ester)-polycarbonate), the thermoplastic composition provided by the blend is ductile at −40° C. as described above. It has also been found that a compositional range of polysiloxane-polycarbonate and poly(aliphatic ester)-polycarbonate exists where it is possible to obtain a broader thermoplastic composition having a balance of the desired transparency (percent transmittance) of greater than 85%, 100% ductility retention to temperatures above −40° C. and an MVR of up to 22 cc/10 min, or in an alternative embodiment, 100% ductility retention to temperatures above −30° C. and an MVR of up to 26 cc/10 min. In some embodiments, for example where the poly(aliphatic ester)-polycarbonate is used in amounts of up to 65 wt % (based on the total weight of polysiloxane-polycarbonate and poly(aliphatic ester)-polycarbonate), the resulting thermoplastic composition provided by the blend may no longer be ductile at −40° C. but may remain 100% ductile at temperatures greater than −40° C. In some applications, this higher temperature ductility may be acceptable, and therefore, in an embodiment, the compositions of the polysiloxane-polycarbonate, poly(aliphatic ester)-polycarbonate, and any added polycarbonate, or weight ratios of these components in the thermoplastic composition may be varied such that the resulting thermoplastic composition is 100% ductile at temperatures greater than or equal to −30° C. In a specific embodiment, it will be understood that in such an instance, the thermoplastic composition may no longer be ductile at temperatures less than −30° C.

Exemplary thermoplastic compositions include blends of poly(dimethylsiloxane)-co-(bisphenol A carbonate) and poly (sebacic acid ester)-co-(bisphenol A carbonate). It will be understood that a wide variety of thermoplastic compositions and articles derived from them can be obtained by not only changing the thermoplastic compositions (e.g., by replacing sebacic acid with adipic acid in the poly(sebacic acid ester)-co-(bisphenol A carbonate) but by changing either or both of the amounts of sebacic acid or siloxane content in the blends while maintaining a constant molecular weight. Similarly, new thermoplastic compositions may be identified by changing the molecular weights of the components in the exemplary copolymer blends while keeping, for example, sebacic acid and/or siloxane content constant.

In particular, the ductility, transparency and melt flow of the thermoplastic compositions may be varied by the composition of the components in the blends. For example, wt % of aliphatic dicarboxylic acid ester units (e.g., sebacic acid) may be varied from 1 to 10 wt % of the total weight of the thermoplastic composition, and similarly the amount of siloxane units may be varied from 3 to 6 wt % of the total weight of the thermoplastic composition. The distribution (in the polymer chain) of the siloxane and sebacic acid in the copolymers may also be varied by choice of synthetic method of the respective copolymers to obtain the desired properties. In this way, thermoplastic compositions having ductility to as low as −60° C. and with high flow (e.g. MVR of up to 22 cc/10 min) may be achieved where the blends of polysiloxane-polycarbonate and poly(aliphatic ester)-polycarbonate are opaque (where the polysiloxane-polycarbonate and poly(aliphatic ester)-polycarbonate polymers before blending are either transparent or opaque), while transparent products with greater than or equal to 83% transmission, haze of less than or equal to 1.6 (measured on a 3.2 mm thick molded plaque), 100% ductility at −40° C. ductility, and high flow (e.g., up to an MVR of 22 cc/10 min) may be obtained with these blends. Thermoplastic compositions having these properties are not obtainable from combinations of, for example, poly(dimethylsiloxane)-co-(bisphenol A carbonate) copolymers with bisphenol A polycarbonate homopolymer.

The thermoplastic composition thus comprises poly(aliphatic ester)-polycarbonate copolymer, polysiloxane-polycarbonate copolymer, and optionally a polycarbonate polymer. In an embodiment, where desired, the thermoplastic composition may also include a polycarbonate (other than the poly(aliphatic ester)-polycarbonate and polysiloxane-polycarbonate) in amounts of up to 10 wt %, based on the total weight of poly(aliphatic ester)-polycarbonate, polysiloxane-polycarbonate, and any added polycarbonate. Specifically useful in the thermoplastic polymer include homopolycarbonates, copolycarbonates, polyester-polycarbonates, blends thereof with polyesters, and combinations comprising at least one of the foregoing polycarbonate-type resins or blends. It should be noted that the inclusion of other polymers such as polycarbonate is permitted provided the desired properties of the thermoplastic composition are not significantly adversely affected. In a specific embodiment, a thermoplastic composition consists essentially of a poly(aliphatic ester)-polycarbonate copolymer, polysiloxane-polycarbonate copolymer, and any added polycarbonate polymer; additives and/or fillers may be included but are not essential to the composition. In another specific embodiment, the thermoplastic composition consists of poly(aliphatic ester)-polycarbonate copolymer, polysiloxane-polycarbonate copolymer, and added polycarbonate polymer. In another specific embodiment, the thermoplastic composition consists of poly(aliphatic ester)-polycarbonate copolymer and polysiloxane-polycarbonate copolymer.

In addition to the poly(aliphatic ester)-polycarbonate copolymer, polysiloxane-polycarbonate copolymer, and added polycarbonate polymer as described hereinabove, the thermoplastic composition can further include various other additives ordinarily incorporated with thermoplastic compositions of this type, where the additives are selected so as not to significantly adversely affect the desired properties of the thermoplastic composition. Mixtures of additives may be used. Such additives may be mixed at a suitable time during the mixing of the components for forming the thermoplastic composition.

Useful additives contemplated herein include, but are not limited to, impact modifiers, fillers, colorants including dyes and pigments, antioxidants, heat stabilizers, light and/or UV light stabilizers, plasticizers, lubricants, mold release agents, flame retardants, antistatic agents, anti-drip agents, radiation (gamma) stabilizers, and the like, or a combination comprising at least one of the foregoing additives. While it is contemplated that other resins and or additives may be used in the thermoplastic compositions described herein, such additives while desirable in some exemplary embodiments are not essential.

In an embodiment, for a test set of 5 molded articles each of 3.2 mm thickness and molded from the thermoplastic composition, 100% of the articles exhibited ductile fracture mode when measured at a temperature of −40° C., according to ASTM D256-04. Also in an embodiment, for a test set of 5 molded articles of 3.2 mm thickness and molded from the thermoplastic composition, 100% of the articles exhibited ductile fracture mode when measured at a temperature of −30° C., according to ASTM D256-04.

In an embodiment, where 100% ductility is retained at temperature of −40° C., the thermoplastic composition has a melt volume rate (MVR) measured at a temperature of 300 ° C. under a load of 1.2 kg and at a dwell time of 6 minutes, of 14 to 22 cc/10 min, specifically 16 to 22 cc/10 min, more specifically 18 to 22 cc/10 min, and still more specifically 19 to 22 cc/10 min, when measured according to ASTM D1238-04. In another embodiment, where 100% ductility is retained at temperature of −30° C., the thermoplastic composition has a melt volume rate (MVR) measured at a temperature of 300° C. under a load of 1.2 kg and at a dwell time of 6 minutes, of 14 to 26 cc/10 min, specifically 18 to 26 cc/10 min, more specifically 20 to 26 cc/10 min, and still more specifically 22 to 26 cc/10 min, when measured according to ASTM D1238-04.

In another embodiment, an article molded from the thermoplastic composition and having a thickness of 3.2 mm has a notched Izod impact (NII) strength of greater than or equal to about 580 J/m, specifically greater than or equal to about 600 J/m, more specifically greater than or equal to about 610 J/m, and still more specifically greater than or equal to about 615 J/m, when measured at a temperature of −40° C., according to ASTM D256-04.

In an embodiment, an article molded from the thermoplastic composition and having a thickness of 3.2 mm has a percent transmittance of greater than 80%, specifically greater than or equal to 85%, and more specifically greater than or equal to 87%, according to ASTM D1003-00.

In an embodiment, an article molded from the thermoplastic composition and having a thickness of 3.2 mm has a haze of less than 2%, specifically less than or equal to 1.6%, more specifically less than or equal to 1.0%, and still more specifically less than or equal to 0.9%, according to ASTM D1003-00.

The thermoplastic composition may be manufactured by methods generally available in the art, for example, in one embodiment, in one manner of proceeding, powdered poly(aliphatic ester)-polycarbonate copolymer, polysiloxane-polycarbonate copolymer, and any added polycarbonate, and other additives as desired are first mixed in a HENSCHEL MIXER® high speed mixer. Other low shear processes including but not limited to hand mixing may also accomplish this blending. The blend is then fed into the throat of an extruder via a hopper. Alternatively, one or more of the components may be incorporated into the composition by feeding directly into the extruder at the throat and/or downstream through a sidestuffer. Additives may also be compounded into a masterbatch with a desired polymeric resin and fed into the extruder. The extruder is generally operated at a temperature higher than that necessary to cause the composition to flow, but at which temperature components of the thermoplastic composition do not decompose so as to significantly adversely affect the composition. The extrudate is immediately quenched in a water batch and pelletized. The pellets, so prepared, when cutting the extrudate may be one-fourth inch long or less as desired. Such pellets may be used for subsequent molding, shaping, or forming.

In a specific embodiment, a method of preparing a thermoplastic composition comprises melt combining a poly(aliphatic ester)-polycarbonate copolymer, polysiloxane-polycarbonate copolymer, and any added polycarbonate. The melt combining can be done by extrusion. In an embodiment, the proportions of poly(aliphatic ester)-polycarbonate copolymer, polysiloxane-polycarbonate copolymer, and any added polycarbonate are selected such that the resultant composition maximizes the melt volume rate (MVR) while not significantly adversely affecting low temperature NII and ductility. In a further specific embodiment, the thermoplastic polymer comprises a polycarbonate-type polymer as defined hereinabove.

Products (e.g., articles) made from the thermoplastic composition(s) can be used in a variety of applications including thin-wall articles, where transparency and ductility retention at low temperatures are both required. Such a blend to provide a thermoplastic composition would reduce the residual stress in the molded article due to the improved ductility and the better flow.

In a specific embodiment, the extruder is a twin-screw extruder. The extruder is typically operated at a temperature of 180 to 385° C., specifically 200 to 330° C., more specifically 220 to 300° C., wherein the die temperature may be different. The extruded thermoplastic composition is quenched in water and pelletized.

Shaped, formed, or molded articles comprising the thermoplastic compositions are also provided. The thermoplastic compositions may be molded into useful shaped articles by a variety of means such as injection molding, extrusion, rotational molding, blow molding and thermoforming. In a specific embodiment, molding is done by injection molding. Desirably, the thermoplastic composition has excellent mold filling capability due to its high flow properties.

The thermoplastic composition can be provided as pellets, and is useful to form articles for use in devices such as portable electronics applications including cell phones, personal digital assistants, DVD players and recording devices, and the like; business equipment including personal computers (e.g., laptops); medical devices, particularly those having complex part geometries requiring high flow (for complete molding) while maintaining acceptable impact performance; eyewear, and in particular safety eyewear requiring high impact strength such as ballistic eyewear; window and automotive glazing applications, particularly large part molding requiring durability, such as sunroofs, panoramic rear windows, and the like.

While specific applications and articles are disclosed herein, one skilled in the art will appreciate that the applications of the thermoplastic compositions herein should not be considered as limited to these applications.

The thermoplastic composition is further illustrated by the following non-limiting examples.

All thermoplastic compositions for the examples (abbreviated Ex. in the following tables) and comparative examples (abbreviated CEx. in the following tables) were prepared using one or more of the following components listed in Table 1.

TABLE 1

| Component | Description | Source |
|---|---|---|
| PC-Si | Polysiloxane-polycarbonate, 6 wt % dimethylsiloxane, average polysiloxane block length of 45 siloxane repeating units, MVR = 10 cc/10 min at 300° C. under 1.2 kg load and 6 minute dwell time; Mw = 23,000 g/mol | SABIC Innovative Plastics |
| PAE-PC | 6 wt % Sebacic acid-co-Bisphenol A polycarbonate (polyester-polycarbonate copolymer), MVR = 38 cc/10 min at 300° C. under 1.2 kg load and 6 minute dwell time, Mw = 21,900 g/mol | SABIC Innovative Plastics |
| BPA-PC | Bisphenol A Polycarbonate, MVR = 31 cc/10 min at 300° C. under 1.2 kg load and 6 minute dwell time, Mw = 20,700 g/mol | SABIC Innovative Plastics |

All thermoplastic compositions were compounded on a Werner and Pfleiderer ZSK 25-mm twin-screw extruder operating at temperatures of from 260 to 300° C. The twin-screw extruder had enough distributive and dispersive mixing elements to produce good mixing of the thermoplastic compositions. The compositions were subsequently dried at about 120° C. for 4 hours and then molded on a Husky or BOY injection-molding machine using barrel temperatures of from 270 to 300° C. and mold temperatures of from 65 to 80° C. It will be recognized by one skilled in the art that the extrusion and molding methods are not limited to these temperatures.

Melt Volume Rate (MVR) was determined at 300° C. under a load of 1.2 kg, and at a dwell time of 6 minutes and is reported in units of cc/10 min. according to ASTM D1238-04.

Notched Izod impact (NII) testing was determined on 3.2 mm thick molded samples (bars) according to ASTM D256-04, at temperatures as low as −40° C., where the NII impact strength is reported in units of joules per meter (J/m). Percent ductility was measured in accordance with ASTM D256-04, on 3.2 mm thick molded NII test samples, using the impact strength as well as stress whitening of the fracture surface to determine the presence of ductile fracture. Generally, significant stress whitening of the fractured surface of the samples, accompanied by gross deformation at the fractured tip where the part remains in one piece and showed no hinge break, indicated ductile failure mode; conversely, lack of significant stress whitening of the fractured surface accompanied by gross deformation at the fractured tip and where the part was bifurcated indicated brittle failure mode. Five (5) molded samples were tested, and percent ductility is expressed as a percentage of samples that exhibited ductile failure mode. Hence, use of the phrase "100% ductile fracture" (reported for a specific temperature) means that for a test set of five molded samples measured at the same temperature, each sample exhibited ductile fracture as described above.

Haze (%) and percent transmission (light transmission) were each determined using 3.2 mm molded plaques according to ASTM D1003-00. Glass transition temperature (Tg, in ° C.) was determined using a differential scanning calorimeter (DSC) operating at a temperature ramp rate of 10° C./min. The glass transition temperatures were determined using the second heat. Values for tensile modulus (in megapascals, MPa) were determined at room temperature according to ISO 527.

Table 2 shows compositional information and properties tested according to the above methods for Comparative Examples 1-7 and Examples 1 and 2, as described below.

(40:60 w/w PAE-PC to BPA-PC in CEx. 4; 80:20 w/w PC-Si to BPA-PC in CEx. 5; and 60:40 w/w PC-Si to BPA-PC in CEx. 6) as described in Table 2. Both materials and their blends were transparent and clear (i.e., have low measured haze as seen in Table 2), and were stable at processing conditions. Transmission (%) and Haze (%) values each showed very similar values compared with all Comparative Examples and Examples 1 and 2. Similarly, mechanical properties, such as elastic modulus, were similar and comparable. Glass transition temperature (Tg) of the blends varied linearly with blend compositions (Table 2).

COMPARATIVE EXAMPLE 7

This composition was a blend of 60% PC-Si copolymer with 40% BPA-PC. This material had a melt flow of 19 cc/10

TABLE 2

| Component | CEx. 1 | CEx. 2 | CEx. 3 | CEx. 4 | CEx. 5 | CEx. 6 | CEx. 7 | Ex. 1 | Ex. 2 |
|---|---|---|---|---|---|---|---|---|---|
| PC-Si (wt %) | — | — | 100 | — | — | 80 | 60 | 80 | 60 |
| PAE-PC (wt %) | — | 100 | — | 40 | 60 | — | — | 20 | 40 |
| BPA-PC (wt %) | 100 | — | — | 60 | 40 | 20 | 40 | — | — |
| Total (wt %) | 100 | 100 | 100 | 100 | 100 | 100 | 100 | 100 | 100 |
| MVR (6 min. dwell) cc/10 min | 31 | 38 | 9.0 | 36 | 36 | 12 | 19 | 14.5 | 21.3 |
| NII (−40° C.) (J/m) | 87 | 114 | 609 | 103 | 110 | 607 | 190 | 633 | 580 |
| Ductility (−40° C.) (%) | 0 | 0 | 100 | 0 | 0 | 100 | 0 | 100 | 100 |
| Transmittance (%) | 89.8 | 89.6 | 87.4 | 89.7 | 89.7 | 87.1 | 86.6 | 87.3 | 87.1 |
| Haze (%) | 0.5 | 0.5 | 0.9 | 0.5 | 0.6 | 1.1 | 1.2 | 1.0 | 1.0 |
| Tg (° C.) | 148 | 131 | 147 | 140 | 137 | 147 | 148 | 143 | 139 |
| Modulus (MPa) | 2,290 | 2,180 | 1,970 | 2,260 | 2,220 | 2,060 | 2,170 | 2,030 | 2,080 |

[1]MVR: Melt volume rate, 300° C./1.2 Kg per ASTM D1238-04.
[2]NII: Notched Izod impact strength (J/m), per ASTM D256-04.

COMPARATIVE EXAMPLE 1

Bisphenol A Polycarbonate homopolymer (BPA-PC) having a weight average molecular weight (Mw) of 20,700 g/mol and an MVR of 31 cc/10 min showed 100% ductile fracture at room temperature (23° C.), as shown in Table 2. Ductility measurements conducted at lower temperatures showed a loss in impact strength and complete brittle fracture for all samples at less than or equal to −10° C.

COMPARATIVE EXAMPLE 2

PAE-PC having a similar weight average molecular weight (Mw 22,400) as in Comparative Example 1, and an MVR of 38 cc/10 min, showed 100% ductile fracture at greater than or equal to −10° C. At temperatures less than −10° C., this material lost its impact strength. The MVR was slightly higher than BPA-PC and Tg was less than that of BPA-PC as shown in Table 2.

COMPARATIVE EXAMPLE 3

PC-Si copolymer having a siloxane content of 6 wt %, a molecular weight of 21,900 g/mol, and an average siloxane block length of 45 repeating units, was used in this comparative example. The Mw is similar to the BPA-PC and PAE-PC used in Comparative Examples 1 and 2. PC-Si as tested had a melt flow of 10 cc/10 min, and remained 100% ductile at temperatures greater than −40° C.

COMPARATIVE EXAMPLES 4, 5, AND 6

Each of these three compositions represents a blend of the materials of Comparative Examples 1 and 2 in different ratios min and had slightly higher haze (1.2) relative to the rest of the examples and comparative examples and was 100% brittle at −40° C. It can be seen that while blending with polycarbonate provideed MVR values approaching the required flow, low temperature ductility (−40° C.) was lost, and haze undesirably increases.

EXAMPLES 1 AND 2

Blends of PC-Si and PAE-PC copolymers were prepared as shown in Table 2, and their properties measured. The PC-Si used had a siloxane content of 6% by weight and a weight average molecular weight of 23,000 g/mol, and an MVR of 10 cc/10 min. PAE-PC copolymer also had a similar molecular weight, and MVR of 38 cc/10 min, and about 6% by weight soft block (i.e., sebacic acid ester unit) content. It can be seen that, as the amount (wt %) of PAE-PC copolymer was increased in the blend relative to PC-Si, the melt flow increased linearly from 10 cc/10 min to 38 cc/10 min and blends remained optically transparent.

Table 2 shows data for Example 1 having a 20:80 w/w PAE-PC to PC-Si blend ratio, and for Example 2 having a 40:60 w/w PAE-PC to PC-Si blend ratio. Example 1 exhibited an MVR of 14.5 cc/10 min and retained 100% ductility to as low as −40° C. Example 2 exhibited an MVR of 21.3 cc/10 min and also retained 100% ductility to as low as −40° C.

Surprisingly, as the % PAE-PC copolymer was increased (e.g., from 0% PAE-PC (i.e., 100% PC-Si, CEx. 3) to 40% by weight of the PAE-PC copolymer (Ex. 2), 100% ductility was retained at −40° C. despite the concurrent increase in MVR from 10 to 22 cc/10 min. Therefore, it is possible to create a material that has an MVR of up to 22 cc/10 min, is optically transparent, and has 100% ductility retention to temperatures as low as −40° C. by blending these materials (PAE-PC and PC-Si). As seen in the data in Table 2, these properties were achieved in the blend without also compromising any other properties, such as mechanical, MVR, and optical properties, and it is also expected that other desirable properties (e.g., flame retardance, etc.) will also be preserved. It can be seen that other thermal properties (Tg) were reduced and tracked inversely with the increase in MVR, and these properties would vary linearly based on the overall blend composition.

FIG. 1 shows a plot of the lowest temperature at which 100% ductility was obtained, versus the weight percentage of PAE-PC in the samples (with data points corresponding to CExs. 1-5, and Examples 1 and 2). The round data points are for compositional blends of PAE-PC with BPA-PC, and the triangular data points are for compositional blends of PAE-PC with PC-Si. It can be seen in the plots that inclusion of PAE-PC in increasing amounts decreased the lowest measured temperature for 100% ductility for PAE-PC blended with BPA-PC. Inclusion of increasing amounts of PAE-PC had the opposite effect in blends with PC-Si, where the increasing amounts of PAE-PC raised the lowest measured temperature for 100% ductility from −40° C. to −10° C., which is the point of 100% ductility for the PAE-PC copolymer.

Figure 2:
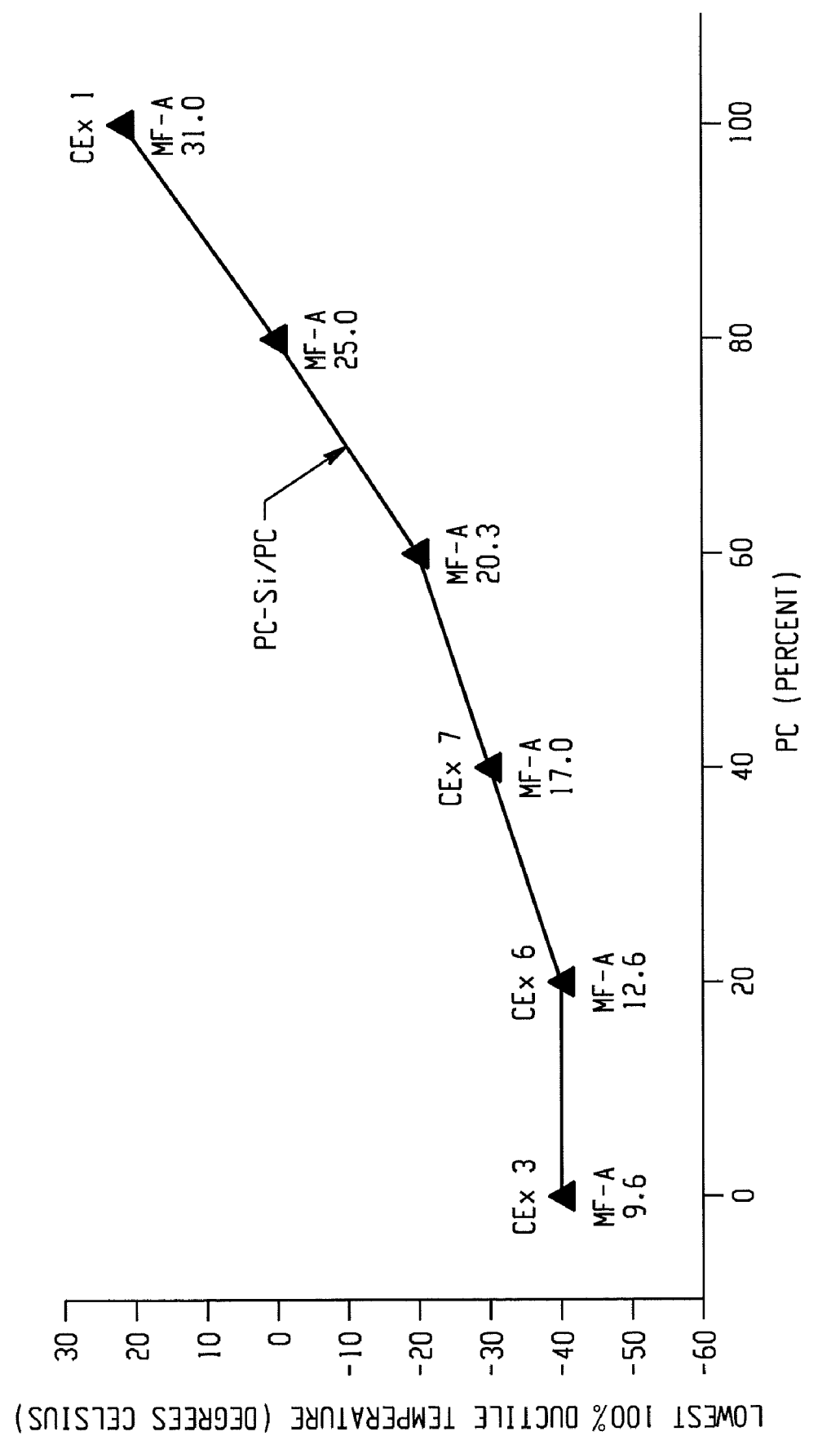
FIG. 2 is a plot of the lowest temperature at which 100% ductility was measured, versus percent by weight for bisphenol A polycarbonate blended with a polysiloxane-polycarbonate copolymer.
Figure 3:
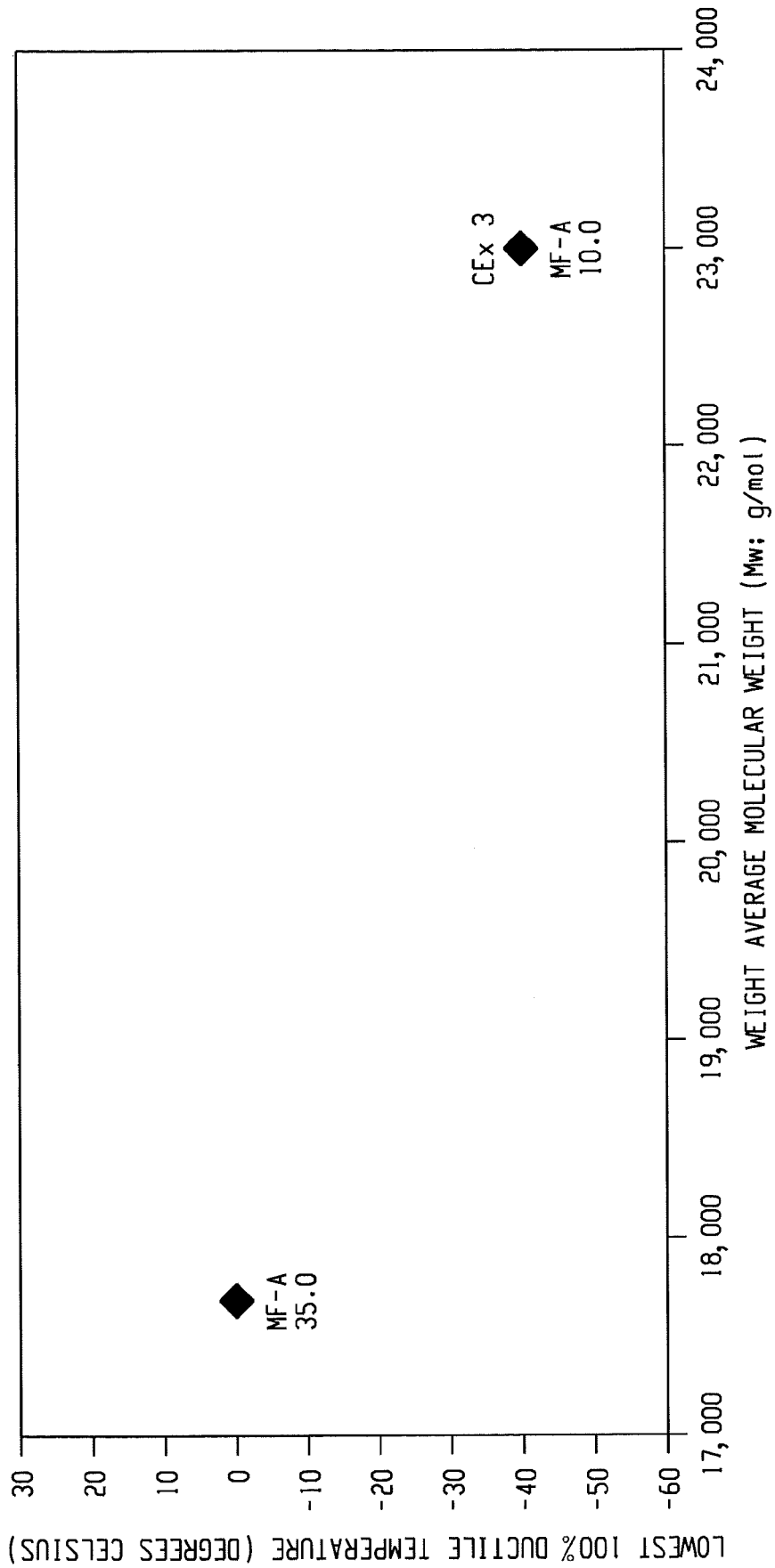
FIG. 3 is a plot of the lowest temperature at which 100% ductility was measured, versus weight average molecular weight for two different molecular weights of a polysiloxane-polycarbonate copolymer.

FIG. 2 shows a comparative plot similar to the plot of PAE-PC blended with PC-Si in FIG. 1, but for a blend of PC-Si with BPA-PC (with data points included for CExs. 1, 3, 4, and 7). As the content of BPA-PC increased, the lowest measured temperature for 100% ductility increased from −40° C. to 23° C. FIG. 3 is a comparative plot showing the effect of molecular weight (Mw) on the lowest temperature at which 100% ductility was measured for a polysiloxane-polycarbonate copolymer with a siloxane content of 6 wt %. It can be seen that the lower the molecular weight, the higher the lowest measured ductility temperature; for a PC-Si copolymer having a molecular weight (Mw) of about 17,600 g/mol, the lowest measured ductility was at 0° C., whereas the lowest measured ductility for CEx. 3 (with an Mw of 23,000 g/mol) was −40° C.

Based on the design space defined by Examples 1 and 2, it can be seen that all blend compositions from 0 wt % PAE-PC to 40 wt % PAE-PC had ductility retention to temperatures as low as −40° C. even though the flow increased from 10 to 22 cc/10 min. Hence, these materials (PAE-PC and PC-Si) can be used to form transparent articles having improved low temperature ductility at higher flow (MVR), and hence excellent mold-filling capabilities, suitable for preparing intricate parts such as thin-wall articles, without any significant compromise on the mechanical properties, optical properties and flow properties.

This written description uses examples to disclose the invention, including the best mode, and also to enable any person skilled in the art to make and use the invention. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

All cited patents, patent applications, and other references are incorporated herein by reference in their entirety. However, if a term in the present application contradicts or conflicts with a term in the incorporated reference, the term from the present application takes precedence over the conflicting term from the incorporated reference.

All ranges disclosed herein are inclusive of the endpoints, and the endpoints are independently combinable with each other.

The use of the terms "a" and "an" and "the" and similar referents in the context of describing the invention (especially in the context of the following claims) are to be construed to cover both the singular and the plural, unless otherwise indicated herein or clearly contradicted by context. Further, it should further be noted that the terms "first," "second," and the like herein do not denote any order, quantity, or importance, but rather are used to distinguish one element from another. The modifier "about" used in connection with a quantity is inclusive of the stated value and has the meaning dictated by the context (e.g., it includes the degree of error associated with measurement of the particular quantity).

We claim:

1. A thermoplastic composition comprising a combination of:
   a) a polysiloxane-polycarbonate copolymer, and
   b) a poly(aliphatic ester)-polycarbonate copolymer comprising soft block ester units of the formula (8a)

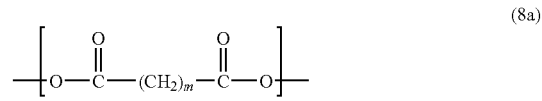

(8a)

wherein m is 4 to 18, wherein the thermoplastic composition has a melt volume rate of 14 cc/10 min to 22 cc/10 min at 300° C. and under a load of 1.2 Kg and a dwell time of 6 minutes, according to ASTM D1238-04, wherein an article molded from the thermoplastic composition and having a thickness of 3.2 mm has a percent transmittance of greater than 85% according to ASTM D1003-00, and wherein 100% of a set of five test articles each having a thickness of 3.2 mm and molded from the thermoplastic composition exhibit ductile fracture at −40° C. when measured for notched Izod Impact according to ASTM D256-04.

2. The thermoplastic composition of claim 1 comprising 55 to 90 wt % polysiloxane-polycarbonate, based on the total weight of polysiloxane-polycarbonate and poly(aliphatic ester)-polycarbonate.

3. The thermoplastic composition of claim 1 wherein the polysiloxane-polycarbonate comprises polydiorganosiloxane blocks having repeating siloxane units of the formula (10):

(10)

wherein each occurrence of R is same or different, and is a $C_{1-13}$ monovalent organic radical, and D has an average value of 30 to 60.

4. The thermoplastic composition of claim 3, wherein the polydiorganosiloxane blocks comprise units of formula (13):

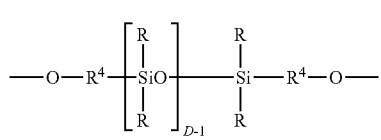

(13)

wherein each occurrence of R is same or different, and is a $C_{1-13}$ monovalent organic radical, and D has an average value of 30 to 60, and each occurrence of $R^4$ is independently a divalent $C_1$-$C_{30}$ aralkylene.

5. The thermoplastic composition of claim 4, wherein the polydiorganosiloxane blocks comprise units of formula (14):

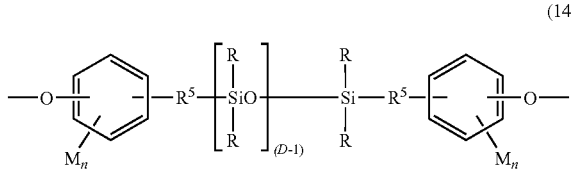

(14)

wherein each R is the same or different, and is methyl or phenyl, D has an average value of 30 to 60, each $R^5$ is independently a divalent $C_2$-$C_8$ aliphatic group, each M is the same or different, and is $C_{1-8}$ alkyl or $C_{1-8}$ alkoxy, and each n is independently 0, 1, 2, 3, or 4.

6. The thermoplastic composition of claim 5, wherein D has an average value of 40 to 60.

7. The thermoplastic composition of claim 1, wherein the polysiloxane-polycarbonate comprises 1 to 6 wt % siloxane units, based on the total weight of the polysiloxane-polycarbonate and poly(aliphatic ester)-polycarbonate.

8. The thermoplastic composition of claim 1, wherein the polysiloxane-polycarbonate has an melt volume rate of 5 cc/10 min to 15 cc/10 min at 300° C. and under a load of 1.2 Kg and a dwell time of 6 minutes, according to ASTM D1238-04.

9. The thermoplastic composition of claim 1, wherein the thermoplastic composition comprises 3 to 4 wt % siloxane units, based on the total weight of the polysiloxane-polycarbonate and poly(aliphatic ester)-polycarbonate.

10. The thermoplastic composition of claim 1 comprising 10 to 45 wt % poly(aliphatic ester)-polycarbonate, based on the total weight of polysiloxane-polycarbonate and poly(aliphatic ester)-polycarbonate.

11. The thermoplastic composition of claim 1, wherein the soft block ester has a glass transition temperature of 128 to 139° C.

12. The thermoplastic composition of claim 1, wherein in the soft block ester units of formula (8a), m is 8 to 10.

13. The thermoplastic composition of claim 1, wherein the poly(aliphatic ester)-polycarbonate has an melt volume rate of 35 cc/10 min to 45 cc/10 min at 300° C. and under a load of 1.2 Kg and a dwell time of 6 minutes, according to ASTM D1238-04.

14. The thermoplastic composition of claim 1, wherein the poly(aliphatic ester)-polycarbonate has a melt volume rate of 35 cc/10 min to 40 cc/10 min at 300° C. and under a load of 1.2 Kg and a dwell time of 6 minutes, according to ASTM D1238-04.

15. The thermoplastic composition of claim 1, wherein the thermoplastic composition comprises 2 to 9 wt % soft block ester units, based on the total weight of the polysiloxane-polycarbonate and poly(aliphatic ester)-polycarbonate.

16. The thermoplastic composition of claim 1 having a glass transition temperature of 135 to 150° C.

17. The thermoplastic composition of claim 1 having a glass transition temperature of 143 to 147° C.

18. The thermoplastic composition of claim 1, further comprising less than or equal to 10 wt % of a polycarbonate homopolymer, based on the total weight of polysiloxane-polycarbonate, poly(aliphatic ester)-polycarbonate, and polycarbonate.

19. The thermoplastic composition of claim 18, wherein the polycarbonate homopolymer is bisphenol A polycarbonate.

20. The thermoplastic composition of claim 16, wherein the polycarbonate has a melt volume rate of 5 cc/10 min to 35 cc/10 min at 300° C. and under a load of 1.2 Kg and a dwell time of 6 minutes, according to ASTM D1238-04.

21. A molded article comprising the thermoplastic composition of claim 1, wherein the molded article is a component of a portable electronic device, a computer, a medical device, an ophthalmic lens, or a glazing for automotive, building, or construction applications or is an in-mold decorated article.

22. A thermoplastic composition comprising a combination of:
  a) a polysiloxane-polycarbonate copolymer, and
  b) a poly(aliphatic ester)-polycarbonate copolymer comprising soft block ester units of the formula (8a)

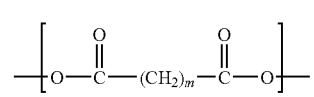

(8a)

wherein m is 4 to 18,
wherein the thermoplastic composition has a melt volume rate of 14 to 26 cc/10 min at 300° C. and under a load of 1.2 Kg and a dwell time of 6 minutes, according to ASTM D1238-04,
wherein an article molded from the thermoplastic composition and having a thickness of 3.2 mm has a percent transmittance of greater than 85% according to ASTM D1003-00, and
wherein 100% of a set of five test articles each having a thickness of 3.2 mm and molded from the thermoplastic composition exhibit ductile fracture at −30° C. when measured for notched Izod Impact according to ASTM D256-04.

23. The thermoplastic composition of claim 22 comprising 35 to 90 wt % polysiloxane-polycarbonate and 10 to 65 wt % poly(aliphatic ester)-polycarbonate, based on the total weight of polysiloxane-polycarbonate and poly(aliphatic ester)-polycarbonate.

24. The thermoplastic composition of claim 22, wherein the thermoplastic composition comprises 3 to 4 wt % siloxane units and 3 to 8 wt % soft block ester units, based on the total weight of the polysiloxane-polycarbonate and poly(aliphatic ester)-polycarbonate.

25. An article comprising a thermoplastic composition comprising:
a) a polysiloxane-polycarbonate, and
b) a poly(aliphatic ester)-polycarbonate comprising soft block ester units of the formula (8a)

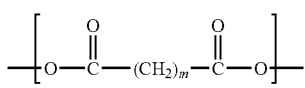

(8a)

wherein m is 8 to 10,
wherein the thermoplastic composition comprises 1 to 6 wt % siloxane units, based on the total weight of the polysiloxane-polycarbonate and poly(aliphatic ester)-polycarbonate and has a glass transition temperature of 143 to 147° C.,
wherein the thermoplastic composition has a melt volume rate of 14 cc/10 min to 22 cc/10 min at 300° C. and under a load of 1.2 Kg and a dwell time of 6 minutes, according to ASTM D1238-04,
wherein an article molded from the thermoplastic composition and having a thickness of 3.2 mm has a percent transmittance of greater than 85% according to ASTM D1003-00, and
wherein 100% of a set of five test articles each having a thickness of 3.2 mm and molded from the thermoplastic composition exhibit ductile fracture at −40° C. when measured for notched Izod Impact according to ASTM D256-04.

26. An article comprising a thermoplastic composition comprising:
a) 55 to 90 wt % of a polysiloxane-polycarbonate, and
b) 10 to 45 wt % of a poly(aliphatic ester)-polycarbonate comprising soft block ester units of the formula (8a)

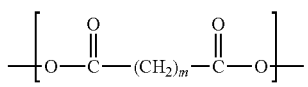

(8a)

wherein m is 8 to 10,
wherein the percentages of polysiloxane-polycarbonate and poly(aliphatic ester)-polycarbonate are each based on the total weight of polysiloxane-polycarbonate and poly(aliphatic ester)-polycarbonate,
wherein the thermoplastic composition comprises 1 to 6 wt % siloxane units, based on the total weight of the polysiloxane-polycarbonate and poly(aliphatic ester)-polycarbonate and has a glass transition temperature of 143 to 147° C.,
wherein the thermoplastic composition has a melt volume rate of 14 cc/10 min to 22 cc/10 min at 300° C. and under a load of 1.2 Kg and a dwell time of 6 minutes, according to ASTM D1238-04,
wherein an article molded from the thermoplastic composition and having a thickness of 3.2 mm has a percent transmittance of greater than 85% according to ASTM D1003-00, and
wherein 100% of a set of five test articles each having a thickness of 3.2 mm and molded from the thermoplastic composition exhibit ductile fracture at −40° C. when measured for notched Izod Impact according to ASTM D256-04.

* * * * *